(12) United States Patent
Ki et al.

(10) Patent No.: US 10,198,293 B2
(45) Date of Patent: *Feb. 5, 2019

(54) DISTRIBUTED REAL-TIME COMPUTING FRAMEWORK USING IN-STORAGE PROCESSING

(71) Applicant: Samsung Electronics Co., Ltd., Suwon-si, Gyeonggi-do (KR)

(72) Inventors: Yang Seok Ki, Palo Alto, CA (US); Jaehwan Lee, Fremont, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,797

(22) Filed: Mar. 17, 2017

(65) Prior Publication Data

US 2017/0192821 A1 Jul. 6, 2017

Related U.S. Application Data

(63) Continuation-in-part of application No. 14/663,249, filed on Mar. 19, 2015, now Pat. No. 9,632,831.

(Continued)

(51) Int. Cl.
G06F 9/46 (2006.01)
G06F 9/50 (2006.01)
G06F 9/48 (2006.01)

(52) U.S. Cl.
CPC .......... *G06F 9/5027* (2013.01); *G06F 9/4881* (2013.01)

(58) Field of Classification Search
None
See application file for complete search history.

(56) References Cited

U.S. PATENT DOCUMENTS 7,657,706 B2 * 2/2010 Iyer ..................... G06F 12/0223
711/109
8,566,831 B2 10/2013 Jellinek et al.
(Continued)

OTHER PUBLICATIONS

Ji, Changqing et al., "Big Data Processing: Big Challenges and Opportunities," Journal of Interconnection Networks, vol. 13, Nos. 3 & 4, Dec. 13-15, 2012, 21 pages.

(Continued)

*Primary Examiner* — Bing Zhao
(74) *Attorney, Agent, or Firm* — Renaissance IP Law Group LLP

(57) ABSTRACT

According to a general aspect, a method may include receiving a computing task, wherein the computing task includes a plurality of operations. The method may include allocating the computing task to a data node, wherein the data node includes at least one host processor and an intelligent storage medium, wherein the intelligent storage medium comprises at least one controller processor, and a non-volatile memory, wherein each data node includes at least three processors between the at least one host processor and the at least one controller processor. The method may include dividing the computing task into at least a first chain of operations and a second chain of operations. The method may include assigning the first chain of operations to the intelligent storage medium of the data node. The method may further include assigning the second chain of operations to the central processor of the data node.

20 Claims, 11 Drawing Sheets

Related U.S. Application Data

(60) Provisional application No. 62/057,203, filed on Sep. 29, 2014.

(56) References Cited

U.S. PATENT DOCUMENTS

| | | | |
|---|---|---|---|
| 8,819,335 B1 | 8/2014 | Salessi et al. | |
| 9,477,511 B2* | 10/2016 | Jacobson | G06F 9/46 |
| 2013/0191555 A1* | 7/2013 | Liu | G06F 3/061 |
| | | | 710/5 |

OTHER PUBLICATIONS

Kang, Yangwook, et al., "Enabling Cost-effective Data Processing with Smart SSD," 2013, 12 pages.

Tran, Nam-Luc et al., "AROM: Processing Big Data With Data Flow Graphs and Functional Programming," 2012, 8 pages.

Zhang, Yanfeng, et al., "Maiter: An Asynchronous Graph Processing Framework for Delta-based Accumulative Iterative Computation," IEEE Transactions on Parallel and Distributed Systems, vol. 25, Issue 8, Aug. 2014, published Sep. 16, 2013, 17 pages.

\* cited by examiner

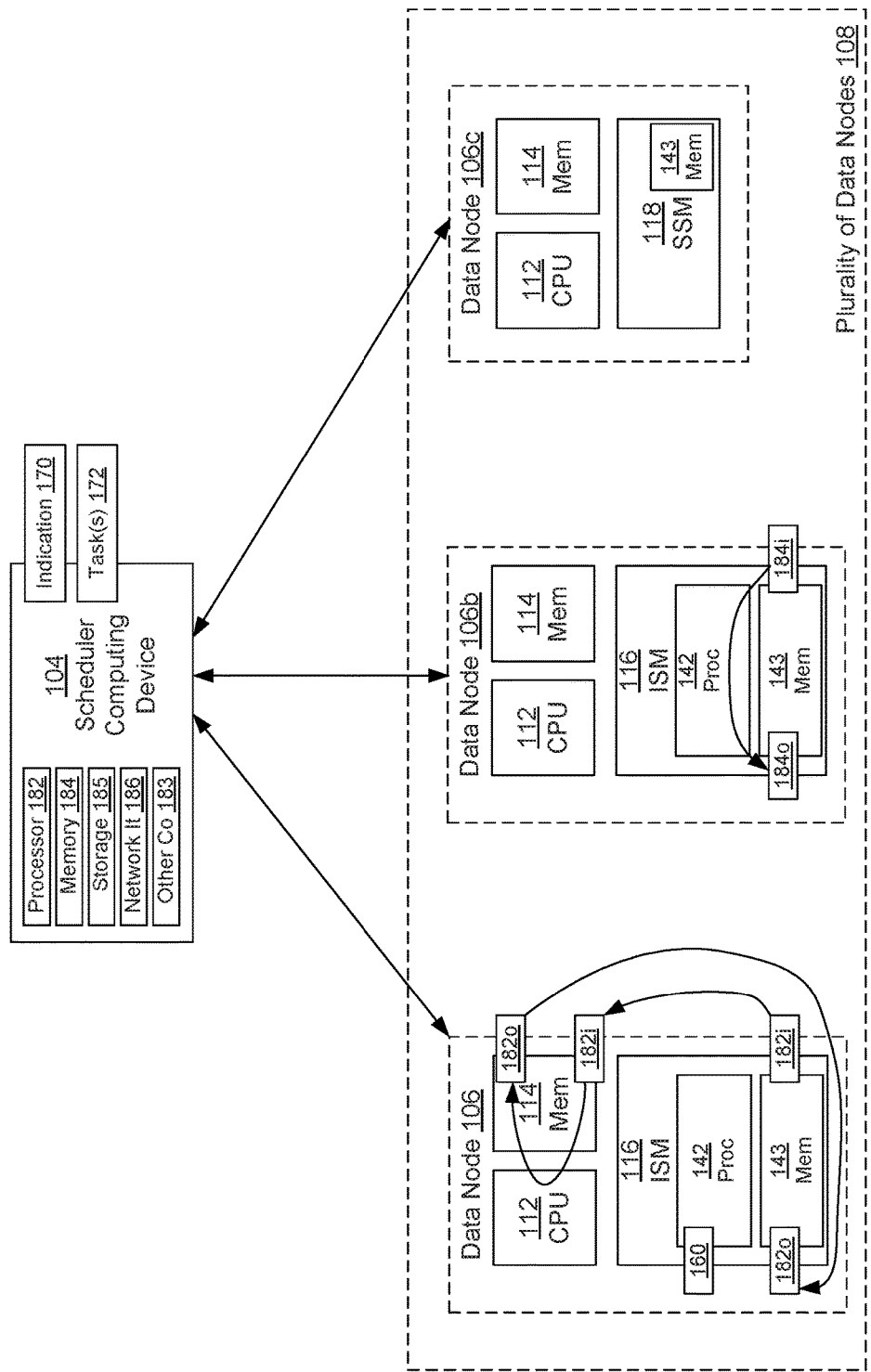

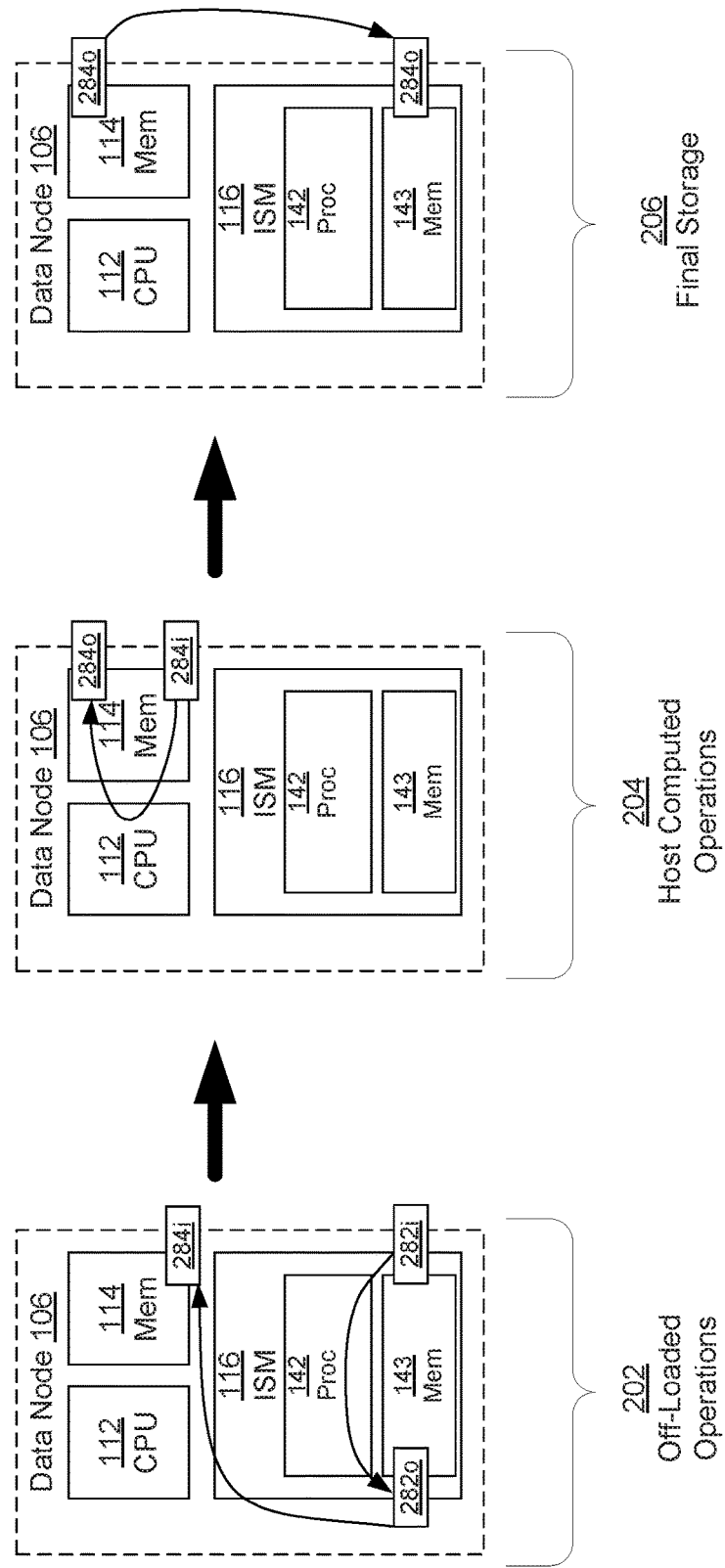

FIG. 3
300

| 312<br>Filter()<br>Sample()<br>GroupByKey()<br>ReduceByKey()<br>PartitionBy()<br>Count()<br>Reduce()<br>LookUp() | 322<br>Off-Loadable classification | 332<br>Off-Loadable classification |
| --- | --- | --- |
| 314<br>Map()<br>FlatMap()<br>MapValues()<br>Collect()<br>Sort() | 326<br>Host-Computable classification | 334<br>Equivocal classification |
| 316<br>Union()<br>Join()<br>Cogroup()<br>CrossProduct()<br>... | | 336<br>Host-Computable classification |

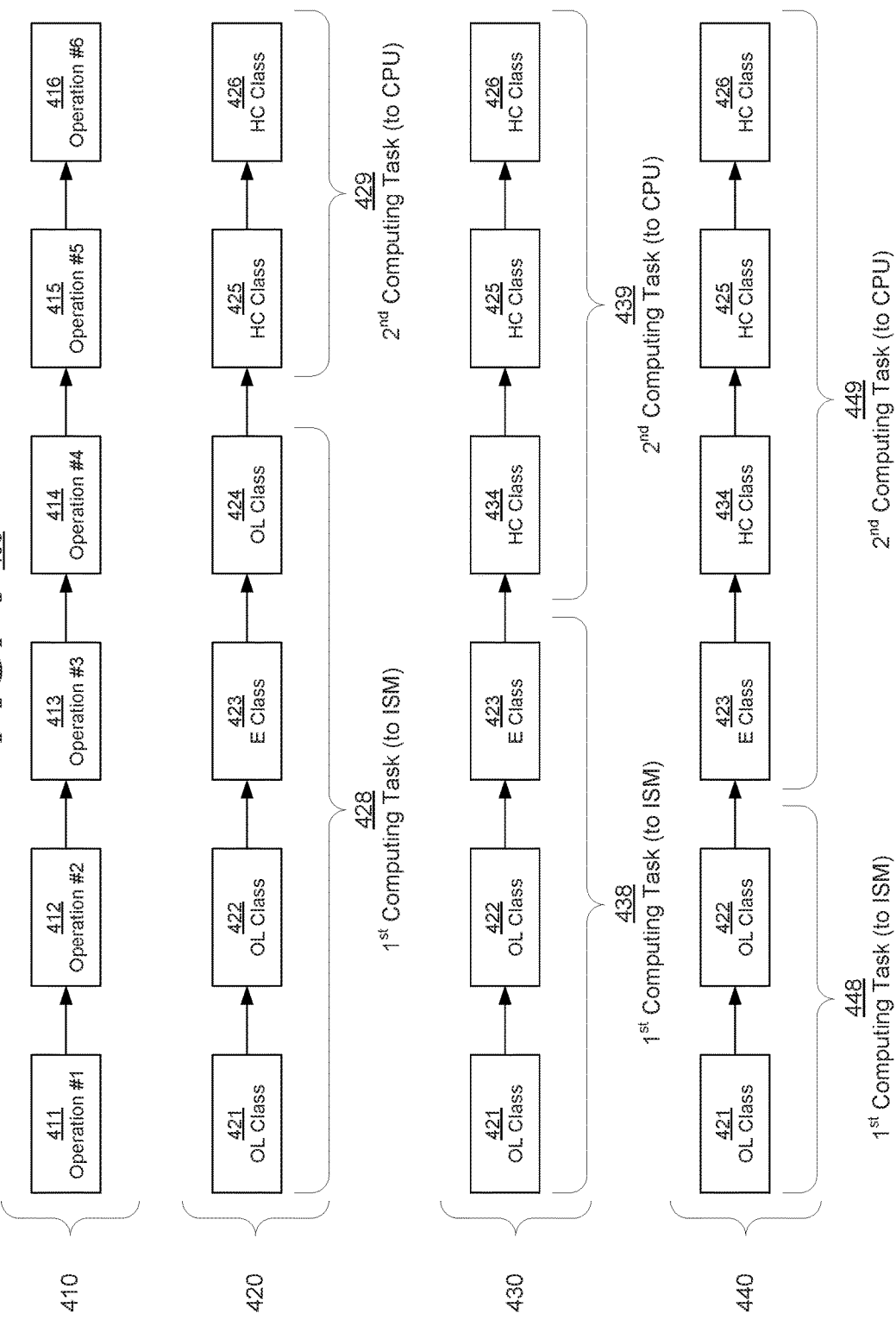

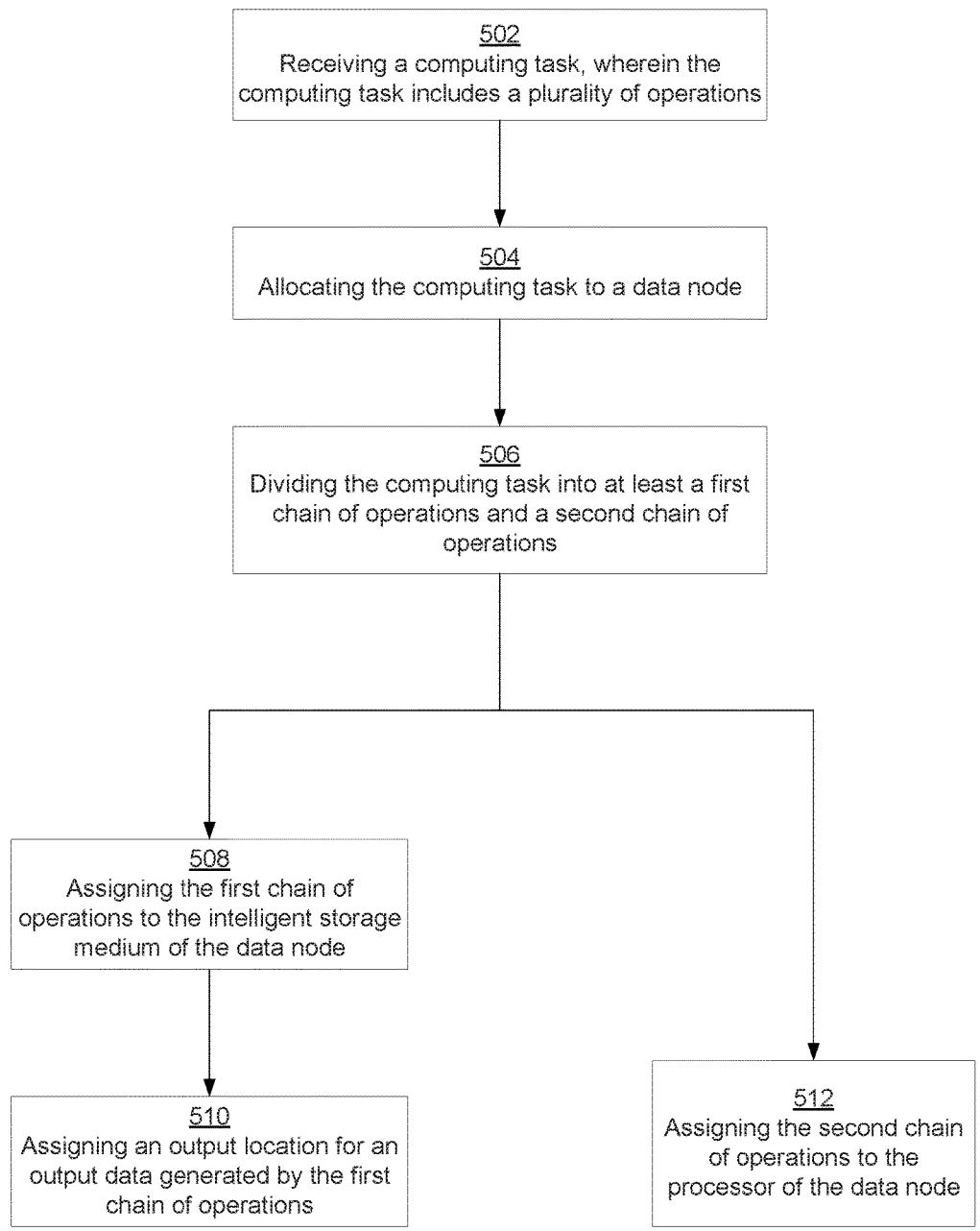

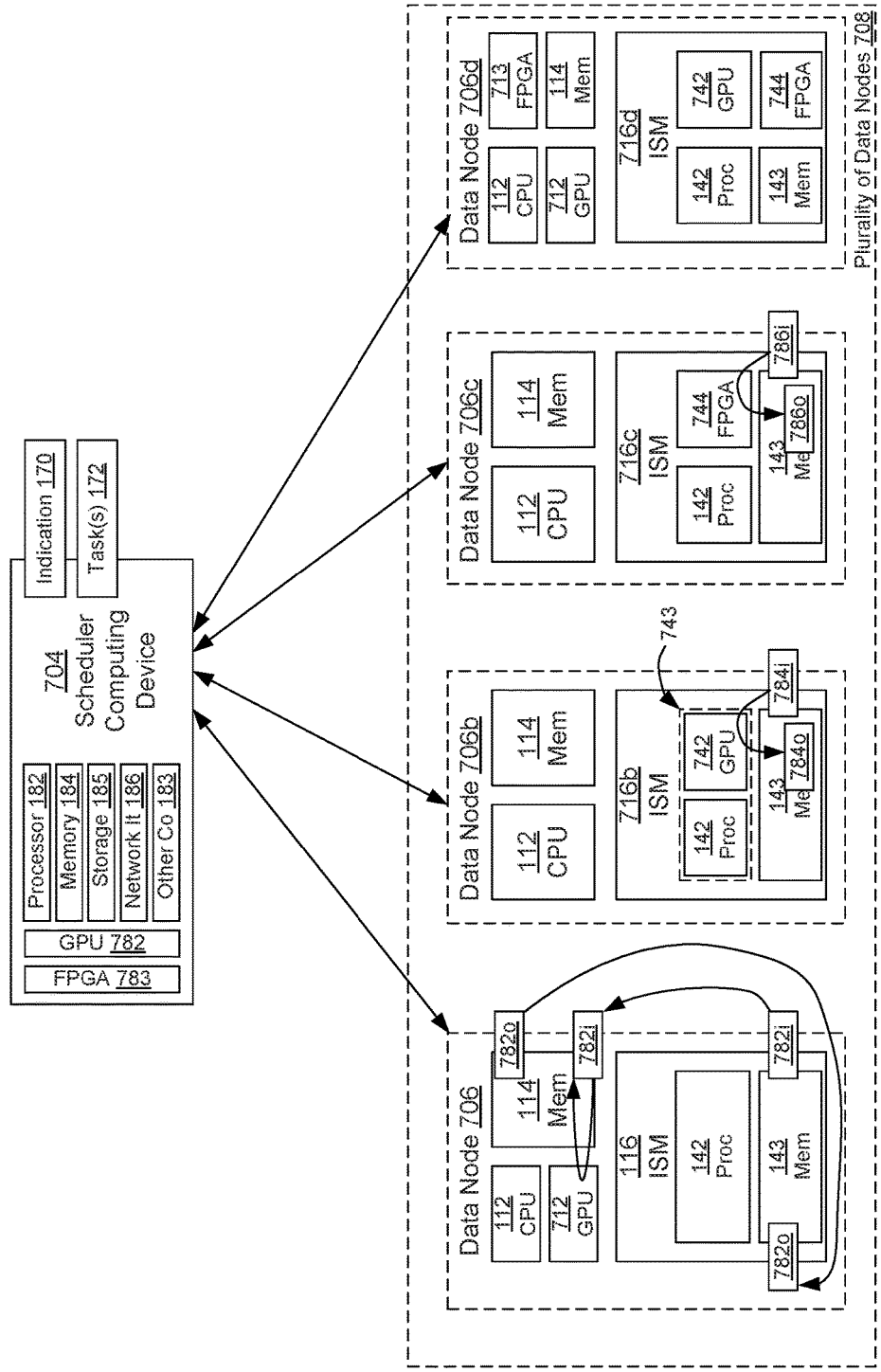

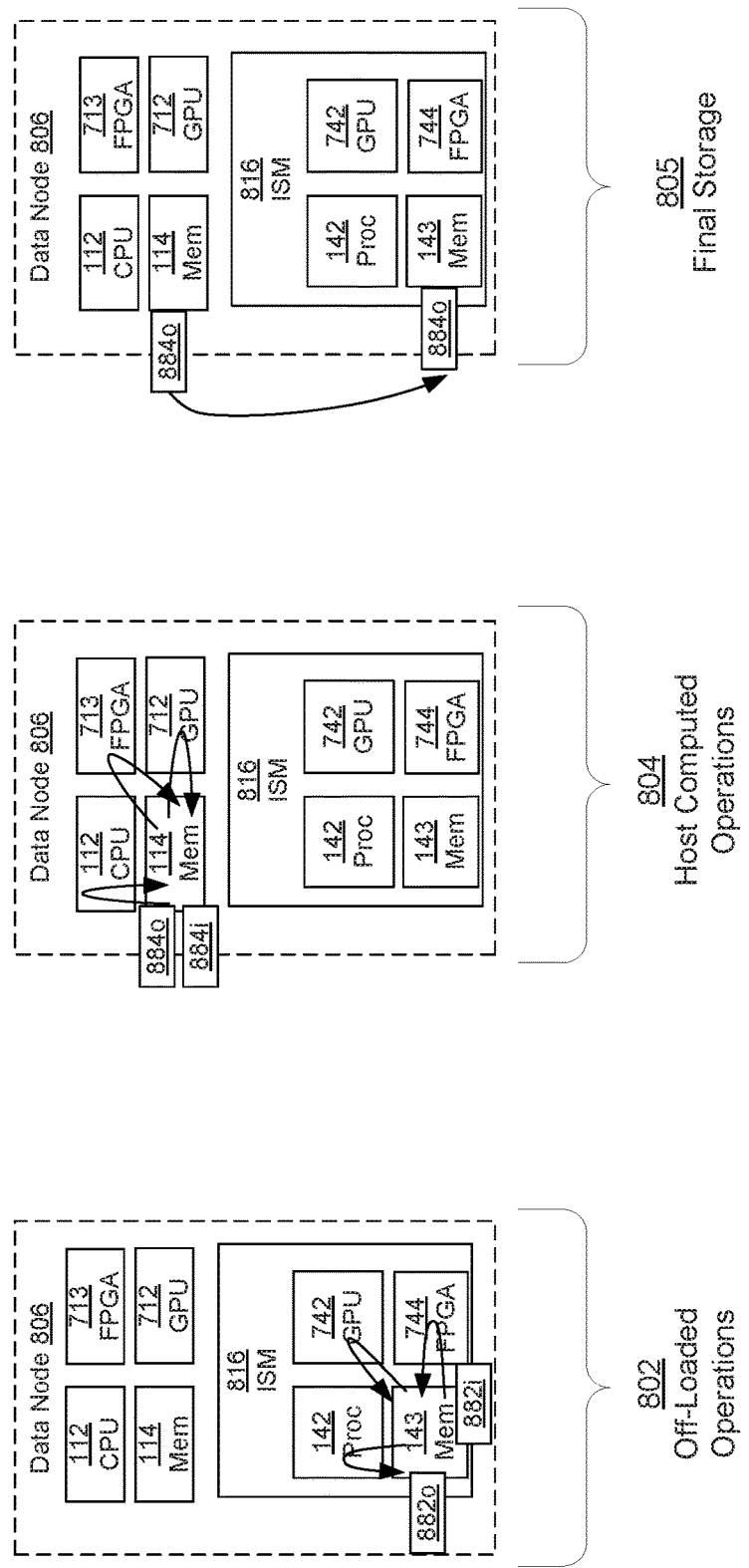

FIG. 9
900

| 312<br>Filter()<br>Sample()<br>GroupByKey()<br>ReduceByKey()<br>PartitionBy()<br>Count()<br>Reduce()<br>LookUp() | 322<br>Off-Loadable<br>classification | 332<br>Off-Loadable<br>classification | 941<br>Off-Loadable classification<br>(Proc Type #1) |
| --- | --- | --- | --- |
| | | | 942<br>Off-Loadable classification<br>(Proc Type #2A) |
| | | | 943<br>Off-Loadable classification<br>(Proc Type #2B) |
| | | 334<br>Equivocal<br>classification | 334<br>Equivocal<br>classification |
| | | 336<br>Host-Computable<br>classification | 945<br>Host-Computable<br>classification<br>(Proc Type #1) |
| 314<br>Map()<br>FlatMap()<br>MapValues()<br>Collect()<br>Sort() | | | 946<br>Host-Computable<br>classification<br>(Proc Type #2) |
| 316<br>Union()<br>Join()<br>Cogroup()<br>CrossProduct()<br>... | 326<br>Host-Computable<br>classification | | |

DISTRIBUTED REAL-TIME COMPUTING FRAMEWORK USING IN-STORAGE PROCESSING

CROSS-REFERENCE TO RELATED APPLICATION

This application is a continuation-in-part of, and claims priority under 35 U.S.C. § 120 to, application Ser. No. 14/663,249, filed on Mar. 19, 2015, under 35 U.S.C. § 119, of U.S. Provisional Application Ser. No. 62/057,203, entitled "DISTRIBUTED REAL-TIME COMPUTING FRAMEWORK USING IN-STORAGE PROCESSING" filed on Sep. 29, 2014. The subject matter of these earlier filed applications are hereby incorporated by reference.

TECHNICAL FIELD

This description relates to processing data, and more specifically, processing data within a distributed computing system.

BACKGROUND

Distributed computing is generally a field of computer science that studies or utilizes distributed systems. A distributed computing system is traditionally a system in which components located on networked computers communicate and coordinate their actions by passing messages amongst themselves. The components interact with each other in order to achieve a common goal. General characteristics of distributed systems may include concurrency of components, lack of a global clock, and allowances for independent failure of components. Examples of distributed systems vary from massively multiplayer online games to peer-to-peer applications.

The word "distributed" in terms such as "distributed system", "distributed programming", "distributed file system", etc. originally referred to computer networks where the individual computers were physically distributed within some geographical area. The term is nowadays used in a much wider sense, and often refers to autonomous processes that run within the same physical location and interact with each other by message passing.

A distributed computing system may have a common goal, such as solving a large computational problem. For example, in some distributed systems, the computational problem may be broken down into a plurality of smaller tasks that may be executed simultaneously or in parallel, and these tasks may be assigned to various computers of the distributed system. In such a system, the larger computational problem may be solved more quickly by leveraging the execution power of the distributed system to process the problem substantially in parallel, as opposed to a single computer processing the problem sequentially.

SUMMARY

According to one general aspect, a scheduler computing device may include a computing task memory configured to store at least one computing task. The computing task may be executed by a data node of a distributed computing system, wherein the distributed computing system includes at least one data node, each data node having a central processor and an intelligent storage medium, wherein the intelligent storage medium comprises a controller processor and a memory. The scheduler computing device may include a processor configured to assign the computing task to be executed by either the central processor of a data node or the intelligent storage medium of the data node, based, at least in part, upon an amount of data associated with the computing task.

According to another general aspect, a method may include receiving a computing task, wherein the computing task includes a plurality of operations. The method may include allocating the computing task to a data node, wherein the data node includes a central processor and an intelligent storage medium, and wherein the intelligent storage medium includes a controller processor and a memory. The method may include dividing the computing task into at least a first chain of operations and a second chain of operations. The method may include assigning the first chain of operations to the intelligent storage medium of the data node. The method may also include assigning the second chain of operations to the central processor of the data node.

According to another general aspect, a data node may include a central processor configured to execute at least one of a first set of operations upon data stored by an intelligent storage medium. The intelligent storage medium may include a memory configured to store data in a semi-permanent manner, and a controller processor configured to execute at least one of a second set of operations upon data stored by the intelligent storage medium. The data node may include a network interface configured to receive a plurality of operations from a scheduling computing device. The data node may be configured to: divide the computing task into at least the first set of operations and the second set of operations, assign the first set of operations to the central processor for execution, and assign the second set of operations to the intelligent storage medium for execution.

According to another general aspect, a scheduler computing device may include a computing task memory, and a processor. The computing task memory may be configured to store at least one computing task. The computing task is to be executed by a data node of a distributed computing system, wherein the distributed computing system comprises at least one data node, each data node having at least one host processor and an intelligent storage medium, wherein the intelligent storage medium comprises at least one controller processor, and a non-volatile memory. Each data node includes at least three processors between the at least one host processor and the at least one controller processor. The processor may be configured to decide whether to assign the computing task to be executed by either one of the host processors of the data node or one of the controller processors of the intelligent storage medium, and assign the computing task to be executed by either one of the host processors of the data node or one of the controller processors of the intelligent storage medium.

According to another general aspect, a method may include receiving a computing task, wherein the computing task includes a plurality of operations. The method may include allocating the computing task to a data node, wherein the data node includes at least one host processor and an intelligent storage medium, wherein the intelligent storage medium comprises at least one controller processor, and a non-volatile memory, wherein each data node includes at least three processors between the at least one host processor and the at least one controller processor. The method may include dividing the computing task into at least a first chain of operations and a second chain of operations. The method may include assigning the first chain of operations to the intelligent storage medium of the data node. The method may further include assigning the second chain of operations to the central processor of the data node.

According to another general aspect, a data node may include a central processor, an intelligent storage medium, and a network interface. The central processor configured to execute at least one of a first set of operations upon data stored by an intelligent storage medium. The intelligent storage medium may include a memory configured to store data, a first controller processor configured to execute at least one of a second set of operations upon data stored by the intelligent storage medium, and a second controller processor configured to execute at least one of a third set of operations upon data stored by the intelligent storage medium. The network interface may be configured to receive a plurality of operations from a scheduling computing device. The data node may be configured to: divide the computing task into at least the first set of operations and a second set of operations, assign the first set of operations to the central processor for execution, and assign the second set of operations to the intelligent storage medium for execution.

The details of one or more implementations are set forth in the accompanying drawings and the description below. Other features will be apparent from the description and drawings, and from the claims.

A system and/or method for processing data, and more specifically, processing data within a distributed computing system, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 2 is a block diagram of an example embodiment of a system in accordance with the disclosed subject matter.

FIG. 3 is a table of an example embodiment of a classification system in accordance with the disclosed subject matter.

FIG. 4 is a block diagram of an example embodiment of a chain of operations in accordance with the disclosed subject matter.

FIG. 5 is a flowchart of an example embodiment of a technique in accordance with the disclosed subject matter.

FIG. 7 is a block diagram of an example embodiment of a system in accordance with the disclosed subject matter.

FIG. 8 is a block diagram of an example embodiment of a system in accordance with the disclosed subject matter.

FIG. 9 is a table of an example embodiment of a classification system in accordance with the disclosed subject matter.

Like reference symbols in the various drawings indicate like elements.

DETAILED DESCRIPTION

Figure 6:
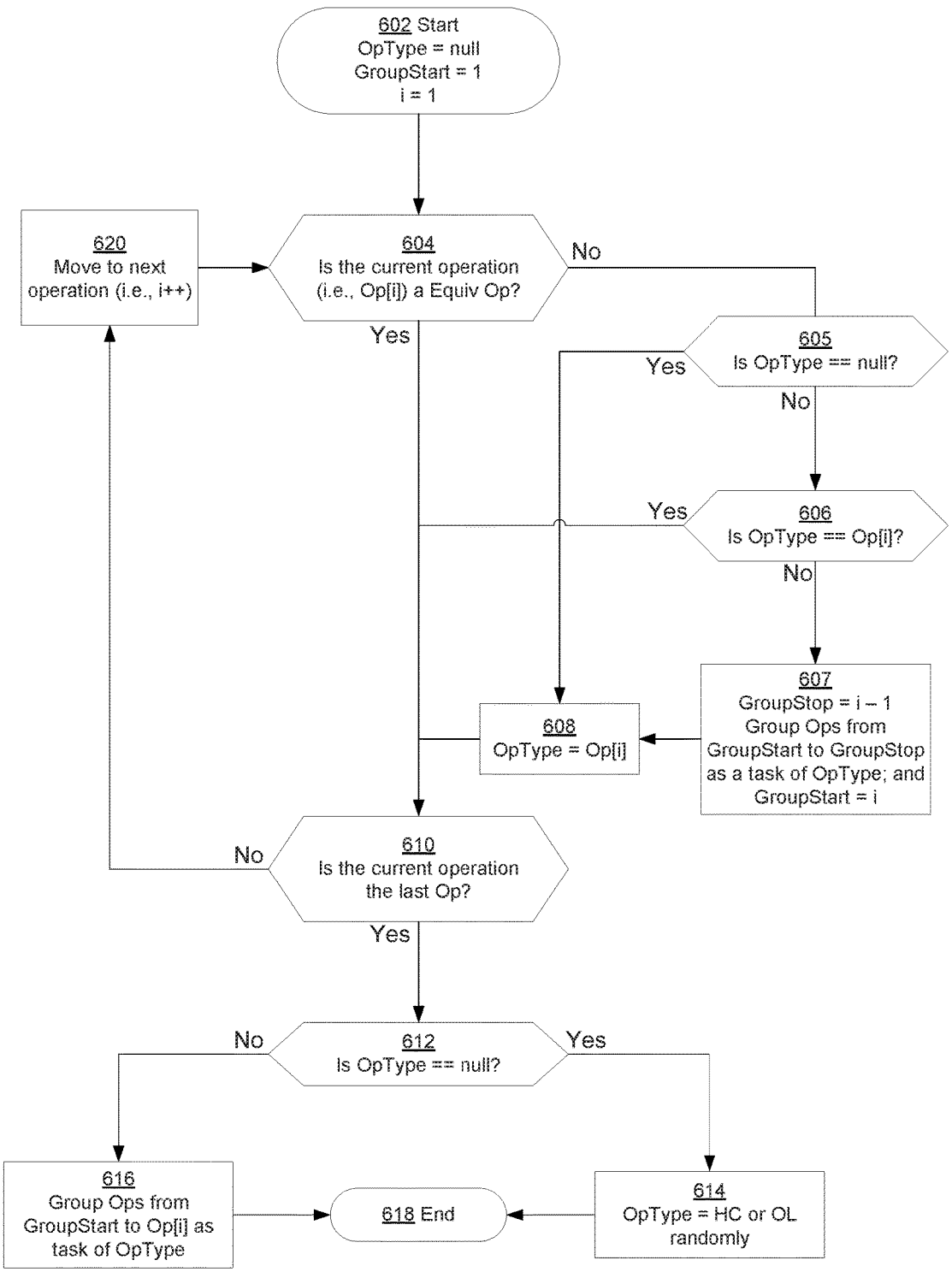
FIG. 6 is a flowchart of an example embodiment of a technique in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a distributed computing system and execute a distributed application; although, it is understood that the above is merely one illustrative example to which the disclosed subject matter is not limited.

In the illustrated embodiment, the system 100 may include a plurality of data nodes 108, and a scheduler computing device or scheduler 104. In such an embodiment, the plurality of data nodes 108 may in turn include individual data nodes (e.g., data nodes 106, 106b, and 106c, etc.). As described above, in various embodiments of a distributed computing system, the scheduler 104 may include or have one or more computing tasks 172 that are to be performed or executed by the distributed computing system.

In various embodiments, the scheduler 104 may include a computing device, such as, for example, a laptop, desktop, workstation, personal digital assistant, smartphone, tablet, and other appropriate computers, etc. or a virtual machine or virtual computing device thereof. In various embodiments, the scheduler 104 may be used by a user (not shown). In various embodiments, the scheduler 104 may include a processor 182 configured to execute one or more machine executable instructions or pieces of software, firmware, or a combination thereof. The scheduler 104 may include, in some embodiments, a memory 184 configured to store one or more pieces of data, either temporarily, permanently, semi-permanently, or a combination thereof. Further, the memory 184 may include volatile memory, non-volatile memory or a combination thereof. In various embodiments, the scheduler 104 may include a storage medium 185 configured to store data in a semi-permanent or substantially permanent form. In various embodiments, the storage medium 185 may be included by the memory 184.

In various embodiments, the scheduler 104 may include one or more network interfaces 186 configured to allow the scheduler 104 to be part of and communicate via a communications network, which may use various protocols. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the scheduler 104 may include one or more other hardware components 183 (e.g., a display or monitor, a keyboard, a mouse, a camera, a fingerprint reader, a video processor, etc.). It is understood that the above are merely a few illustrative examples to which the disclosed subject matter is not limited.

In various embodiments, the data nodes 108 may each include similar hardware components as those described in reference to the scheduler 104 (e.g., network interface 186, other components 183, etc.). In such an embodiment, the data nodes 108 may also or alternately include the components described below (e.g., intelligent storage medium (ISM) 116, central processor 112, etc.). It is understood that the above are merely a few illustrative examples to which the disclosed subject matter is not limited.

The data nodes 108 may include the computing devices that are employed to execute the computing tasks 172. The scheduler 104 may be configured to assign the computing tasks 172 to the various data nodes 108 for execution.

In such an embodiment, each computing task 172 may be associated with a respective piece of data (e.g., data 182$i$, etc.). That piece of data may be stored on only one (or possibly more) data node (e.g., data node 106, etc.). The scheduler 104 may maintain an indication 170 that indicates which pieces of data are stored by which data nodes 108. In such an embodiment, when the scheduler 104 decides which data node will be assigned the computing task 172, it may examine the indication 170 and determine what data node(s) are storing the associated data.

For example, if a first computing task 172 is associated with data 182$i$, it might not be assigned to data node 106b, as data 182$i$ is not found within data node 106b. Instead, that computing task 172 may be assigned to data node 106, as data node 106 stores the data 182$i$. Likewise, a second computing task 172 that is associated with data 184$i$ might not be assigned to data node 106 (as data 184$i$ is not stored there), but to data node 106b (which stores data 184$i$). In such an embodiment, the scheduler 104 may generate a computing task 172 to move data between data nodes (e.g., move data 184$i$ from data node 106b to data node 106), but that is mostly outside the scope of the disclosed subject matter.

Traditionally, a data node (e.g., data node 106c, etc.) included a central processing unit (CPU) or central processor 112, a memory 114 (e.g., a random access memory (RAM), etc.), and a storage medium 118 that in turn included a memory 143 (e.g., a magnetic memory, a solid-state memory, etc.). Traditionally, the only processor able to perform the task in the data node would be the central processor 112. Therefore, data had to be moved throughout the data node 106c such that the central processor 112 could have access to it. This involved moving the data from/to each of the three main components (storage medium 118, memory 114, and central processor 112). Each movement of the data incurred additional power consumption and took a certain amount of time. Further, as the system resources provided by the central processor 112 and memory 114 (e.g., compute cycles, storage space) were limited, the movement of data consumed those system resources, too.

In the illustrated embodiment, the plurality of data nodes 108 may include components that allow the movement of data to be reduced, and hence the overhead incurred by such movement (e.g., power consumed, travel and processing time, etc.) to be reduced.

In the illustrated embodiment, the data nodes (e.g., data node 106, etc.) may still include a central processing unit (CPU) or central processor 112, a memory 114 (e.g., a random access memory (RAM), etc.) but may now also include an intelligent storage medium (ISM) 116. In such an embodiment, the intelligent storage medium 116 may include a controller processor 142 and a memory 143 (e.g., a magnetic memory, a solid-state memory, etc.). In this context, the traditional storage medium, without an externally accessible or assignable controller processor 142, may be referred to as a "simple storage medium (SSM)" (e.g., SSM 118, etc.).

In such an embodiment, the data node 106 may include two (or more) processors. In the illustrated embodiment, the system 100 may be configured to assign computing tasks 172 not just to a data node, as a whole, but to specific components within that data node.

In such an embodiment, this may allow the movement of data (e.g., data 184$i$, etc.) to be reduced or effectively eliminated. For example, if the controller processor 142 is assigned to perform the computing task 172, the data need not be moved outside of the ISM 116, as described below.

As a first example, that shows a case similar to the traditional usage, in the illustrated embodiment, the scheduler 104 may assign a computing task 172 not just to data node 106, but also to the central processor 112. In such an embodiment, the movement of the data 182$i$ may occur similarly to the traditional case. Specifically, data 182$i$ may be stored permanently or semi-permanently in the memory 143 of the intelligent storage medium 116. When the computing task 172 is to be executed, this data 182$i$ may be copied from the ISM 116 to the memory 114. The central processor 112 may then access the data 182$i$ from the memory 114. The results of the computing task 172 or the output data 182$o$ may be stored within the memory 114. Eventually (e.g., at the end of the computing task, etc.), the output data 182$o$ may be permanently or semi-permanently stored within the ISM 116.

As a second example that deviates more substantially from the traditional usage case, in the illustrated embodiment, the scheduler 104 may assign a computing task 172 not just to data node 106$b$, but also to the intelligent storage medium 116. In such an embodiment, the movement of the data 184$i$ may be drastically reduced compared to the first example above or the traditional case, also described above. In such an embodiment, the data 184$i$ may be stored permanently or semi-permanently in the memory 143 of the intelligent storage medium 116. When a computing task 172 is to be executed, this data 184$i$ may be copied or accessed from the memory 143 by the controller processor 142. In such an embodiment, the communication bus or channel (not shown) between the ISM 116 and the memory 114 may be avoided, thus reducing consumption of the previously described system resources. The results of the computing task 172 or the output data 184$o$ may be stored permanently or semi-permanently within the memory 143 (again avoiding the use of system resources to move the data between the memory 114 and the ISM 116).

As described below in reference to FIGS. 2, 3, and 4, the scheduler 104 may not be solely concerned with minimizing the system resources used when moving data about a data node (e.g., data node 106, etc.). For example, not all computing tasks 172 may be capable of being performed by a controller processor 142. Traditionally, a controller processor 142's function may not have included the performance of computing tasks 172. Instead, the controller processor 142's two primary functions may have been (1) to manage the communication between the ISM 116 and the rest of any apparatus (e.g., data node 106, etc.) that may include the ISM 116, and (2) manage the storage of data within the memory 143. In the illustrated embodiment, an ISM's controller processor 142 may be configured to perform these traditional functions, but also may be configured to execute computing tasks 172. For example, an ISM 116 that includes a solid-state drive (SSD) may have a controller processor 142 configured to perform data management functions, such as, for example error-correcting code (ECC) computation, wear leveling management, bad block mapping, read scrubbing and read disturb management, read and write caching, garbage collection, and/or encryption, etc.

In some embodiments, the controller processor 142 may be capable of only performing a limited set or, more generally, a first set of operations or instructions. In such an embodiment, the instructions or operation codes (opcodes) detailing how to perform the higher-level operations of the computing tasks 172, or how to translate the higher-level operations of the computing tasks 172 into lower-level operations understandable by the controller processor 142 may be stored in a firmware 160 or memory of the controller processor 142. In some embodiments, such firmware 160 may be occasionally updated or edited to adjust or add new capabilities (e.g., new operations that may be performed, etc.) to the controller processor 142. In another embodiment, the operations or some of the operations may be hardwired or physically part of the structure of the controller processor 142. It is understood that the above are merely a few illustrative examples to which the disclosed subject matter is not limited.

In an embodiment in which the control set of the controller processor 142 is a subset of all possible operations, the scheduler 104 may be limited in its ability to assign tasks 172 to the ISM 116 (as opposed to the central processor 112) by the operations supported by the controller processor 142. In various embodiments, different data nodes (e.g., data node 106 and data node 106$b$, etc.) may support different operations. For example, a first ISM (e.g., the ISM 116 of data node 106) may be made by a different manufacturer, have a different version of the firmware 160, etc., than a second data node (e.g., the ISM 116 of data node 106$b$). As such, the two data nodes may support different capabilities or operations. In some embodiments, the scheduler 104 may assign a task 172 to the ISM 116 of the first data node, but (due to differing capabilities) assign the same or similar task 172 to the central processor 112 of the second data node. It is understood that the above is merely one illustrative example to which the disclosed subject matter is not limited.

In such an embodiment, it may be possible to upgrade or alter the firmware 160 to change the operations supported by the ISM 116 or alter the way an operation is performed by the ISM 116, etc. In another embodiment, the firmware 160 or other structure to perform the operations may be wholly or partially fixed or unalterable. It is understood that the above are merely a few illustrative examples to which the disclosed subject matter is not limited.

Further, in various embodiments, the plurality of data nodes 108 may include a mixture of ISMs 116 and SSMs 118. In some embodiments, a different sets or groups of pluralities of data nodes 108 may exist. In such an embodiment, each set or group may include or be divided by different characteristics and/or capabilities. It is understood that the disclosed subject may include embodiments with both heterogeneous and homogeneous environments.

In another embodiment, the central processor 112 may be more powerful than the controller processor 142. In such an embodiment, the performance of a computing task 172 by the central processor 112 may be more efficient than the performance would be via the controller processor 142. In some embodiments, the benefits of such efficiency may outweigh the increase in usage of system resources incurred by moving the data to a place accessible by the central processor 112. In such an embodiment, the scheduler 104 may be configured to consider the overall efficiency of the system 100 when assigning computing tasks 172 to the processors 112 or 142.

In yet another embodiment, a computing task 172 may include a series or chain of smaller operations. In such an embodiment, the scheduler 104 may be configured to break or divide a larger computing task 172 into two or more smaller computing tasks 172. In various embodiments, the scheduler 104 may be able to create smaller computing tasks 172 that include only operations that may be performed by a single processor (e.g., either the central processor 112 or the controller processor 142). In such an embodiment, the scheduler 104 may be configured to create computing tasks 172 in a way that increases the efficiency of the system 100.

For example, in one embodiment, a larger computing task 172 may need to be performed, in part, by the central processor 112 but may also include a second part that may be performed by the controller processor 142. In such an embodiment, the scheduler may be configured to break or divide the larger computing task 172 such that a first part or smaller computing task may be performed by the central processor 112 and a second part or smaller computing task may be performed by the controller processor 142.

In one embodiment, the scheduler 104 may select a break point or operation to split the larger computing task 172 based on the amount of data that would be moved or copied from the ISM 116 to the memory 114 (or other component). In various embodiments, it may be beneficial to reduce the amount of data copied between the two components. In another embodiment, the efficiency of computation may be a concern For example, it may be more efficient for the central processor 112 to execute certain operations even if they result in more data than is desirable. It is understood that the above are merely a few illustrative examples to which the disclosed subject matter is not limited.

In yet another embodiment, the larger computing task 172 may be split or divided into more than two sets or chains of operations. For example, a first smaller computing task or chain of operations may be assigned or performed by the ISM 116. Then, at a determined point or operation, a second smaller computing task or chain of operations may be assigned or performed by the central processor 112 (e.g., when a complex operation is encountered, the amount of data to copy is small, etc.). Finally, a third smaller computing task or chain of operations may be assigned or performed by the ISM 116, and the larger computing task 172 may conclude with the output data being stored within the ISM 116. It is understood that the above is merely one illustrative example to which the disclosed subject matter is not limited.

In some embodiments, the scheduler 104 may be configured to dictate or decided where the output data of a computing task 172 or chain of operations is to be stored. Returning to the above three smaller computing task example, the scheduler 104 may dictate that the output data of the first smaller computing task be stored in the memory 114 (e.g., as input data for the second smaller computing task). Likewise, the scheduler 104 may dictate that the output data of the third smaller computing task be stored in the ISM's memory 143. It is understood that the above is merely one illustrative example to which the disclosed subject matter is not limited.

In one embodiment, as described above, the scheduler 104 may even be configured to dictate that the output data be stored in an entirely different data node. For example, the scheduler 104 may dictate that the output data (e.g., data 182o, etc.) be stored in another data node (e.g., data node 106b, etc.) and not the back into the ISM's memory 143. In such an embodiment, the scheduler 104 may be able to manage the entire plurality of data nodes 108, not just the scheduling of computing tasks 172 to a particular data node or processor. It is understood that the above is merely one illustrative example to which the disclosed subject matter is not limited.

In yet another embodiment, the system 100 may be configured such that the scheduler computing device 104 may assign a plurality of operations or tasks 172 to a data node (e.g., data node 106, etc.) and then the data node itself may divide the larger computing task 172 into more than two sets or chains of operations. As described above, a first smaller computing task or chain of operations may be assigned by the data node 106 to be performed by the data node's ISM 116. Then, a second smaller computing task or chain of operations may be assigned by the data node to be performed by the data node's central processor 112. The larger computing task 172 may be further divided into third or further smaller computing tasks, as described above, except that in this embodiment the data node may perform the division and assignment instead of the scheduler computing device 104. It is understood that the above is merely one illustrative example to which the disclosed subject matter is not limited.

For the sake of clarity of example, herein the disclosed subject matter will be described to embodiments in which the scheduler computing device 104 performs the division of the larger computing task 172 into smaller computing tasks and the assignment thereof. However, it is understood that this is merely one possible embodiment to which the disclosed subject matter is not limited.

FIG. 2 is a block diagram of an example embodiment of a system 200 in accordance with the disclosed subject matter. In various embodiments, the system 200 shows a data node 106 that includes a CPU or central processor 112, a memory 114, and an intelligent storage medium (ISM) 116. The ISM 116 may include a controller processor 142 and a memory 143, as described above.

In the illustrated embodiment, it is shown that a larger computing task or chain of operations may be divided into smaller computing tasks or chains of operations (e.g., off-loaded operations 202, host computed operations 204, etc.) and then assigned to be performed by either the central processor 112 or the ISM 116. In various embodiments, more than two smaller computing tasks may exist but two are shown for non-limiting, illustrative purposes.

In the illustrated embodiment, the scheduler computing device may detect that a first set or chain of operations may be performed by the ISM 116. In this context, these operations may be considered to be off-loaded from the central processor 112 that would traditionally perform them. These operations may be included as off-loaded operations 202, and may be assigned to the ISM 116.

In such an embodiment, the off-loaded operations 202 may be associated with the input data 282i that is stored in the ISM's memory 143. This input data 282i may be accessed by the controller processor 142. The controller processor 142 may execute or perform the off-loaded operations 202, without the aid or, in some embodiments, the knowledge of the central processor 112. In such an embodiment, the central processor 112 may be busy executing a different set of operations (not shown) that may access different data and/or be related to a different computing task. It is understood that the above is merely one illustrative example to which the disclosed subject matter is not limited. The execution of the off-loaded operations 202 may result in the output data 282o.

In various embodiments, at the end of the execution of the off-loaded operations 202, the output data 282o may be stored either within the ISM's memory 143 or within the memory 114. In one embodiment, if the next chain of operations or computing task that accesses the data 282o is one assigned to the central processor 112, the data 282o may be copied from the ISM 116 to the memory 114 (e.g., like the data 182i of FIG. 1, etc.). In another embodiment, if the next chain of operations or computing task that accesses the data 282o is one assigned to the ISM 116, or if the off-loaded operations 202 are the final operations in the larger computing task, etc. it may be more efficient and convenient to have the data 282o stored locally within the ISM's memory 143. It is understood that the above are merely a few illustrative examples to which the disclosed subject matter is not limited.

In the illustrated embodiment, the scheduler may be aware that the next chain of operations or computing task is one assigned to the central processor 112. As such, in the illustrated embodiment, the scheduler may dictate or indicate that the final output of the off-loaded operations 202 is to be stored in the memory 114 of the data node 106, and not the ISM's memory 143. It is understood that the above is merely one illustrative example to which the disclosed subject matter is not limited.

In the illustrated embodiment, the next set or chain of operations may include operations that are to be performed by the central processor 112. In such an embodiment, these operations may be referred to as "host computed operations 204" and may be assigned to the host or central processor 112. In various embodiments, the central processor 112 may read the input data 284i from the memory 114 (e.g., random access memory (RAM), etc.). The central processor 112 may execute the operations 204, performing whatever data manipulations are dictated by those host-computed operations 204. In some embodiments, the intermediate results or data may be stored within the central processor 112's internal memories (e.g., registers, caches, etc.) and/or in the memory 114.

In one embodiment, at the end of the host-computed operations 204, the final output data 284o may be stored to the memory 114. As described above, in various embodiments, the scheduler may dictate that the final output data 284o be stored in the memory 114 or the ISM 116. In another embodiment, the scheduler may be configured only to dictate the final storage location when off-loaded operations 202 are involved.

In the illustrated embodiment, the output data 284o may be stored in the memory 114. In such an embodiment, a final operation (e.g., final storage 206, etc.) may move the output data 284o from the memory 114 to the ISM 116. It is understood that the above is merely one illustrative example to which the disclosed subject matter is not limited.

FIG. 3 is a table 300 of an example embodiment of a classification system in accordance with the disclosed subject matter. In the illustrated embodiment, the table 300 shows a number of example operations, subroutines, or functions. The table 300 then shows two example classification or categorization schemes that may be employed with the disclosed subject matter. It is understood that the above are merely a few illustrative examples to which the disclosed subject matter is not limited.

In the illustrated embodiment, group 312 shows a number of example operations in which the size of the input data is expected to be greater than the size of the output data. In such an embodiment, it may be desirable not to transfer the larger input data across the communications bus to the main memory of the data node. Instead, it may be more desirable to transfer, if necessary and after the operation has completed, the smaller output data across the communications bus to the main memory of the data node (e.g., if needed for a host-computed operation, etc.).

The table 300 lists a few example operations that may be included in a group where the size of the input data is expected to be greater than the size of the output data. These example operations may include, in various embodiments: Filter( ), Sample( ), GroupByKey( ), ReduceByKey( ), PartitionBy( ), Count( ), Reduce( ), and LookUp( ), It is understood that the above are merely a few illustrative examples to which the disclosed subject matter is not limited.

In the illustrated embodiment, group 314 shows a number of example operations in which the size of the input data is expected to be roughly equal to the size of the output data. In such an embodiment, it may or may not be desirable to transfer the input data across the communications bus to the main memory of the data node. In some embodiments, the desirability of this relatively neutral action may depend upon what operations will occur next in the chain of operations. If the next operation is to be performed by the central processor, it may be desirable to transfer the input data now, and perform the operation of group 314 by the central processor. Conversely, if the next operation is to be performed by the controller processor, it may be desirable to keep the data and operation on the intelligent storage medium. It is understood that the above are merely a few illustrative examples to which the disclosed subject matter is not limited.

The table 300 lists a few example operations that may be included in a group where the size of the input data is expected to be roughly equal to the size of the output data. These example operations may include, in various embodiments: Map( ), FlatMap( ), MapValues( ), Collect( ), and Sort( ), It is understood that the above are merely a few illustrative examples to which the disclosed subject matter is not limited.

In the illustrated embodiment, group 316 shows a number of example operations in which the size of the input data is expected to be less than the size of the output data. In such an embodiment, it may be desirable to transfer the larger input data across the communications bus to the main memory of the data node. Indeed, it may be desirable to transfer, before the operation has completed, the smaller input data across the communications bus to the main memory of the data node (e.g., if needed for a host-computed operation, etc.).

The table 300 lists a few example operations that may be included in a group where the size of the input data is expected to be less than the size of the output data. These example operations may include, in various embodiments:

Union( ), Join( ), Cogroup( ), CrossProduct( ), It is understood that the above are merely a few illustrative examples to which the disclosed subject matter is not limited.

The second or middle column of table 300 illustrates a first categorization or classifying scheme that may be employed with the disclosed subject matter. In the illustrated embodiment, the operations may be labeled or identified as belonging to one of two categories: an off-loadable classification 322 or a host-computable classification 326.

In the illustrated embodiment, operations in which the size of the output data is expected to be less than or equal to the input data may be classified into the off-loadable classification 322 and performed by the ISM's controller processor. In such an embodiment, data transfers between the data node's main memory and the ISM may be reduced, as not occurring, only occurring when the data size is relatively small, or no worse than if the input data was transferred.

In the illustrated embodiment, operations in which the size of the output data is expected to be greater than to the input data may be classified into the host computable classification 326 and performed by the data node's central processor. In such an embodiment, data transfers between the data node's main memory and the ISM may be reduced, as occurring when the input data size is relatively small. In some embodiments, the operations of group 314 may be part of the host computable classification 326 and not the off-loadable classification 322 as the difference in the input and output data sizes may be negligible for that group. It is understood that the above is merely one illustrative example to which the disclosed subject matter is not limited.

The third or right column of table 300 illustrates a second categorization or classifying scheme that may be employed with the disclosed subject matter. In the illustrated embodiment, the operations may be labeled or identified and belonging to one of three categories: an off-loadable classification 332, an equivocal classification 334, or a host-computable classification 336. It is understood that the above are merely a few illustrative examples of classification schemes to which the disclosed subject matter is not limited.

In the illustrated embodiment, operations in which the size of the output data is expected to be less than the input data may be classified into the off-loadable classification 332 and performed by the ISM's controller processor. In such an embodiment, data transfers between the data node's main memory and the ISM may be reduced, as not occurring, only occurring when the data size is relatively small, or no worse than if the input data was transferred.

In the illustrated embodiment, operations in which the size of the output data is expected to be greater than to the input data may be classified into the host computable classification 336 and performed by the data node's central processor. In such an embodiment, data transfers between the data node's main memory and the ISM may be reduced, as occurring when the output data size is relatively small.

In the illustrated embodiment, operations in which the size of the output data is expected to be roughly equal to the input data may be classified into the equivocal classification 334. In such an embodiment, operations of this class may not be a priori assigned to either central processor or the ISM. Instead, as the cost saving incurred by transferring or not transferring the input/output data may be low or negligible, the scheduler may feel that these operations (e.g., group 314) may be assigned either place, as is most beneficial for the overall processing of operations.

In such an embodiment (e.g., that shown in FIGS. 6a and 6b, etc.) the processor assignment of these equivocal operations 334 may depended upon what the next operation's classification is. For example, if an equivocal operation is sandwiched between two off-loadable operations it may not make sense to assign the equivocal operation to the central processor (incurring the cost of two data transfers). However, if an equivocal operation is sandwiched between an off-loadable operation and a host-computable operation it may make sense to assign the equivocal operation to the central processor (or vice versa). In such an embodiment, a data transfer would occur at either the end or beginning of the equivocal operation, but neither data transfer would be much worse as the size of the input/output data would be roughly equal. But, the equivocal operation might benefit from the greater computing power of the central processor. It is understood that the above are merely a few illustrative examples to which the disclosed subject matter is not limited.

In various embodiments, the relative sizes between the input data and output data may be based upon a tolerance or threshold measure of different sizes. In another embodiment, the sizes of the input/output data may be based upon predefined averages or historical expectations and not dynamically evaluated for each operation and piece of data associated with that particular instance of the operation. It is understood that the above are merely a few illustrative examples to which the disclosed subject matter is not limited.

Further, it is understood that while these groups (e.g., groups 312, 314, and 316) have been delimitated by the size of the input data compared to the output data, in various other embodiments, other concerns may cause an operation to be part of a group or classification. For example, some operations may not be performable by the intelligent storage medium (e.g., due to lack of firmware support, etc.). In such an embodiment, the operation may be considered a host-computable operation (e.g., within group 316) regardless of the size of the input data compared to the output data. In another embodiment, the controller processor may simply be very inefficient at performing an operation and it may be classified as a host-computable operation regardless of the size of the input data compared to the output data. It is understood that the above are merely a few illustrative examples to which the disclosed subject matter is not limited.

In various embodiments, a scheduler may assign an off-loadable operation (e.g., of classifications 322 or 332) to a central processor and not to the usual ISM's controller processor. For example, off-loadable operations (e.g., of group 312) result in an amount of output data less than their input data. As such, it may be beneficial to transfer data between the data node's memory and the ISM after an off-loadable operation has been executed. In such an embodiment, if a previous host-computable operation (e.g. of group 316) resulted in a large amount of output data, it may be beneficial to the system to assign an off-loadable operation to the central processor. In such an embodiment, the amount of data may be reduced before it is transferred back to the ISM (e.g., for final storage, further execution of other off-loadable operations, etc.). It is understood that the above are merely a few illustrative examples to which the disclosed subject matter is not limited.

Conversely, a scheduler may assign a host-computable operation (e.g., of classifications 322 or 332) to an ISM's controller processor and not to the usual central processor (if physically possible). For example, if a sole (or a very few) host-computable operations exists at the very end of a larger computing task and if the ISM's controller processor is physically capable of executing those operations, it may be beneficial to the system to simply avoid the ISM to memory data transfer by having the ISM just finish off the larger computing task and execute the host-computable operation. It is understood that the above is merely one illustrative example to which the disclosed subject matter is not limited.

FIG. 4 is a block diagram 400 of an example embodiment of a chain of operations in accordance with the disclosed subject matter. FIG. 4 illustrates how a scheduler may take a larger computing task, classify each of the operations that comprise the larger computing task, divide the larger computing task into two or more smaller computing tasks or chains of operations, and then assign each of those smaller computing tasks or chains of operations to either the central processor or the ISM for execution. It is understood that the above is merely one illustrative example to which the disclosed subject matter is not limited.

In the illustrated embodiment, portion 410 shows how a larger computing task may include a series or chain of operations that execute one after the other. In the illustrated embodiment, this larger computing task includes, in order, operation #1 411, operation #2 412, operation #3 413, operation #4 414, operation #5 415, and operation #6 416. In various embodiments, these operations may be received by the scheduler without any form of pre-classification. In another embodiment, these operations may be tagged or marked as favoring assignment to a particular processor (e.g., the data node's central processor, the ISM's controller processor, etc.). It is understood that the above are merely a few illustrative examples to which the disclosed subject matter is not limited.

Portion 420 of FIG. 4 shows that the scheduler may classify or categorize each operation of the larger computing task. In the illustrated embodiment, operation #1 421 and operation #2 422 may both be classified as off-loadable (OL) operations, and may be considered part of a first smaller computing task 428 that will be assigned to the ISM. Operation #3 423, however, may be classified as an equivocal (E) operation and its assignment (both to a particular smaller computing task and/or processor) may not be so clear-cut. Operation #4 424 may also be classified as off-loadable (OL) operation that will be assigned to the ISM.

In one embodiment (not shown), the scheduler may create three computing tasks from the four operations 421, 422, 423, and 424. A first computing task may include operations 421 and 422 and be assigned to the ISM. A second computing task may include the equivocal operation 423 and be assigned to the central processor. A third computing task may include the off-loadable operation 424 and be assigned back to the ISM. This however, might involve a number of avoidable transfers (both of data and of control of the execution of the operations).

In the illustrated embodiment, the scheduler may assign the equivocal operation 423 to the ISM. In such an embodiment, the operations 421, 422, 423, and 424, may all be assigned to a first computing task 428 and may also be assigned to the ISM. In such an embodiment, the number of transfers may be reduced and the efficiency of the system increased. It is understood that the above is merely one illustrative example to which the disclosed subject matter is not limited.

In the illustrated embodiment, the operation 425 may be classified as a host computable (HC) operation and may be not fit within the first or off-loadable computing task 428. Instead, a second computing task 429 may be created for operations that are to be assigned to the data node's central processor. Operation 426 may also be a host computable (HC) operation and placed within this second computing task 429.

Portion 430 of FIG. 4 shows that the scheduler may classify or categorize each operation of the larger computing task, but in this case operation #4 434 is not classified as an off-loadable operation, but instead a host-computable operation. For example, in this embodiment, operation #4 434 may be a different operation than operation #4 424, or the system may simply use a different classification scheme such that the same operation is classified differently. Regardless, portion 430 merely shows that, given different operation classifications, the larger computing task may be sub-divided in different ways. It is understood that the above is merely one illustrative example to which the disclosed subject matter is not limited. FIG. 6 provides a more detailed description of a possible embodiment of the process of sub-division.

Again, in the illustrated embodiment, operation #1 421 and operation #2 422 may both be classified as off-loadable (OL) operations, and may be considered part of a first smaller computing task 438 that will be assigned to the ISM. Operation #3 423, however, may be classified as an equivocal (E) operation and its assignment (both to a particular smaller computing task and/or processor) may not be so clear-cut.

However, as described above, operation #4 434 may be classified as a host computable operation that will be assigned to the central processor. In the illustrated embodiment, the scheduler may assign the equivocal operation 423 to the ISM (as was done in portion 420), and not the central processor (as may be done in an alternate embodiment). In such an embodiment, the operations 421, 422, and 423 may be assigned to a first computing task 438 and may also be assigned to the ISM.

In the illustrated embodiment, the operations 425 and 426 may again be classified as host computable (HC) operations. In such an embodiment, the operations 434, 425, and 426 may be included within the second computing task 439 and may be assigned to the data node's central processor.

As described above, in some embodiments, the system may generate the smaller computing tasks 448 and 449 of Portion 440. In the illustrated embodiment, of Portion 440 the grouping rules may differ from those of Portion 430. In such an embodiment, operation #3 423 may be grouped with host computable operation #4 434 and assigned to the second computing task 449. In such an embodiment, only operations 421 and 422 may be included within the first computing task 448. It is understood that the above is merely one illustrative example to which the disclosed subject matter is not limited.

Further, it is understood that while only two smaller computing tasks were shown, in various embodiments, three or more computing tasks may be created out of a larger computing task. In yet another embodiment, a larger computing task may not be sub-divided (e.g., if all operations are of a single classification, etc.).

In yet another embodiment, a scheduler may be configured to determine if a chain of operations is really linear or sequential. In some embodiments, the scheduler may be configured re-order operations to increase efficiently or reduce the number of computing tasks, or number of data transfers. In the illustrated embodiment, an in-order scheme has been shown, but it is understood that the above is merely one illustrative example to which the disclosed subject matter is not limited.

FIG. 5 is a flow chart of an example embodiment of a technique 500 in accordance with the disclosed subject matter. In various embodiments, the technique 500 may be used or produced by the systems such as those of FIG. 1, 2, or 7. Furthermore, portions of technique 500 may be used to create the data structures or classifications such as that of FIG. 3 or 4. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a computing task may be received, as described above. In various embodiments, the computing task may include a plurality of operations, as described above. In various embodiments, one or more of the action(s) illustrated by this Block may be performed by the apparatuses or systems of FIG. 1, 2, or 7, the scheduler computing device 104 of FIG. 1, as described above.

Block 504 illustrates that, in one embodiment, the computing task may be allocated to a data node, as described above. In some embodiments, the data node may include a central processor and an intelligent storage medium, as described above. In one such embodiment, the intelligent storage medium may include a controller processor and a memory, as described above. In various embodiments, one or more of the action(s) illustrated by this Block may be performed by the apparatuses or systems of FIG. 1, 2, or 7, the scheduler computing device 104 or data nodes 108 of FIG. 1, as described above.

Block 506 illustrates that, in one embodiment, the computing task may be divided into at least a first chain of operations and a second chain of operations, as described above. In one embodiment, dividing may include categorizing each operation into at least a first category or a second category. In such an embodiment, an operation associated with the first category may generate an amount of output data that is less than an amount of input data, as described above. In such an embodiment, an operation associated with the second category may generate an amount of output data that is greater than an amount of input data, as described above. In another embodiment, dividing may include determining an operation at which the computing task transitions from operations of one category of operations and to operations of another category of operations, and dividing the computing task into different chains of operations at the operation, as described above.

In yet another embodiment, dividing may include classifying each operation into one or at least three categories, as described above. In such an embodiment, a first category may be associated with the central processor of the data node, a second category may be associated with the intelligent storage medium of the data node, and a third category may be associated with both the central processor and the intelligent storage medium of the data node, as described above. In such an embodiment, dividing may further include, if a current operation is associated with the third category, assigning the current operation to either the central processor of a data node or the intelligent storage medium of the data node, based upon a category associated with either a prior operation or a next operation, as described above. In various embodiments, one or more of the action(s) illustrated by this Block may be performed by the apparatuses or systems of FIG. 1, 2, or 7, the scheduler computing device 104 of FIG. 1, as described above.

Block 508 illustrates that, in one embodiment, the first chain of operations may be assigned to the intelligent storage medium of the data node, as described above. In various embodiments, one or more of the action(s) illustrated by these Blocks may be performed by the apparatuses or systems of FIG. 1, 2, or 7, the scheduler computing device 104 or data nodes 108 of FIG. 1, as described above.

Block 510 illustrates that, in one embodiment, an output location for an output data generated by the first chain of operations may be assigned, as described above. In various embodiments, assigning an output location may include: if a next operation is assigned to the central processor of the data node, dictate that an output data of the first chain of operations be stored in a memory of the data node, and if the next operation is assigned to the intelligent storage medium, dictate that an output data of the first chain of operations be stored in the intelligent storage medium, as described above. In various embodiments, one or more of the action(s) illustrated by this Block may be performed by the apparatuses or systems of FIG. 1, 2, or 7, the scheduler computing device 104 of FIG. 1, as described above.

Block 512 illustrates that, in one embodiment, the second chain of operations may be assigned to the central processor of the data node, as described above. In various embodiments, one or more of the action(s) illustrated by these Blocks may be performed by the apparatuses or systems of FIG. 1, 2, or 7, the scheduler computing device 104 or data nodes 108 of FIG. 1, as described above.

FIG. 6 is a flowchart of an example embodiment of a technique 600 in accordance with the disclosed subject matter. Specifically, technique 600 illustrates one embodiment of a scheme for dividing a larger computing task into at least a first chain of operations and a second chain of operations. In various embodiments, the technique 600 may be used with or produced by the systems such as those of FIG. 1, 2, or 7. It is understood that the above is merely one illustrative example to which the disclosed subject matter is not limited.

Block 602 illustrates that, in one embodiment, the larger chain of operations and the bookkeeping values of the division may be reset to known values. In the illustrated embodiment, the bookkeeping values may include: an index (i) tracking which operation is a prior, current or next operation, a start point (GroupStart) that may be a point or operation where the newer or current smaller computing task might start, and an operation type (OpType) or classification associated with the current smaller grouping task or the previous operation. In the illustrated embodiment, the OpType may be an ISM assigned or off-loaded computing task, and a host computed task, as described above. It is understood that the above are merely a few illustrative examples to which the disclosed subject matter is not limited.

A current operation (Op[i]) may be selected for evaluation and classification. In various embodiments, the scheduler may "walk" though the chain of operations classifying each in turn.

Block 604 illustrates that, in one embodiment, the current operation may be examined to determine if it is an equivocal operation, or (more generally stated) of an OpType that is neither an off-loaded computing task nor a host computed task. If the current operation is not an equivocal operation, the flow of technique 600 may move to Block 605 for further evaluation. Conversely, if the current operation is an equivocal operation, the flow of technique 600 may move to Block 610.

Block 610 illustrates that, in one embodiment, it may be determined if the current operation is the last or final operation of the larger computing task. If not, Block 620 illustrates that, in one embodiment, the scheduler may move to and evaluate the next operation (e.g., i=i+1 or i++). If the current operation is the last operation, the chain of operations may be divided into an ISM assigned or off-loaded computing task and a host computed task, as described below.

Returning to Block 605, Block 605 illustrates that, in one embodiment, if the current operation is not an equivocal operation, technique 600 may determine if the operation type for the current group of computing tasks has been set yet (i.e. if the current OpType is not null or otherwise undefined). If the operation type (e.g., host or off-loaded, etc.) is not assigned, it may be because this is the first operation to be included in the current group of computing tasks. If the current operation is the first operation in the current computing task, technique 600 may proceed to Block 608. In Block 608, the operation type of the current group of computing tasks (i.e., the active OpType) may be set to the same classification as the current operation (e.g., an off-loaded computing task or a host computed task). Once the classification or OpType of the current group of computing tasks has been set, the flow of technique 600 may move to Block 610 for further evaluation, as described above.

If the current or active OpType has been previously defined, technique 600 may instead proceed from Block 605 to Block 606. Block 606 illustrates that, in one embodiment, the classification associated with the current operation may be compared to the current or active OpType associated with the current group of computing tasks. If the current operation (i.e., Op[i]) is of the same classification as the groups' classification (i.e., OpType), the current operation may be added to the current group, and the flow of technique 600 may move to Block 610 for further evaluation, as described above.

If the current operation (i.e., Op[i]) is of a different classification than the group's classification (i.e., OpType), the larger computing task may be split into two computing tasks (or another computing task, if two tasks already exist). Block 607 illustrates that, in one embodiment, the last operation (GroupStop) of the current computing task may be set to the previous operation (i.e., Op[i−1]), and the current computing task may be assigned as dictated by the associated OpType (e.g., off-loaded computing task, a host computed task, etc.). Further, a new group or computing task may be created (by setting GroupStart to the current operation). This new group or computing task may be associated with a classification of the current operation, as shown in Block 608.

In the illustrated embodiment, if the previous operation was an equivocal operation, the equivocal operation may be the last operation in the current computing task (e.g., as seen in Portion 430 of FIG. 4, etc.). In another, non-illustrated embodiment, the equivocal operation may become the first operation in the new computing task (e.g., as seen in Portion 440 of FIG. 4, etc.). In yet another embodiment, a more complex system of rules may determine to which computing task a previous equivocal operation (or string of equivocal operations) may be grouped. It is understood that the above are merely a few illustrative examples to which the disclosed subject matter is not limited.

As described above, in Block 610 In the illustrated embodiment, a determination may be made as to whether or not the current operation is the last operation. As described above, if the current operation is not the last operation, the flow of technique 600 may proceed to Block 620 and the next operation may be processed. Conversely, if the current operation is the last operation, the flow of technique 600 may proceed to Block 612.

Block 612 illustrates that, in one embodiment, it may be determined if the OpType is set (i.e., was at least one operation not an equivocal operation?). If so, Block 614 illustrates that, in one embodiment, the OpType of the current computing task may be set randomly to either an off-loadable category or host-computable category. In another embodiment, other rules or assignment schemes may be employed. For example, a preference may be given to classifying the computing task as an off-loadable task. It is understood that the above are merely a few illustrative examples to which the disclosed subject matter is not limited.

However, if OpType was set (e.g., either off-loadable category or host-computable category, etc.), Block 616 illustrates that, in one embodiment, the larger computing task may be divided into a task defined by the GroupStart variable and the current operation. In the illustrated embodiment, the newly defined smaller computing task may be assigned a classification of OpType.

Block 618 illustrates that, in one embodiment, the scheduler may end the evaluation or division process. The scheduler may then assign the smaller computing tasks or divided chains of operation to the respective processors, as described above. It is understood that the above is merely one illustrative example to which the disclosed subject matter is not limited.

FIG. 7 is a block diagram of an example embodiment of a system 700 in accordance with the disclosed subject matter. In such an embodiment, a more heterogeneous system 700 is shown.

In the illustrated embodiment, the computing devices 704, 706 may include a plurality of different processor types. For example, the scheduler computing device 704 may include the traditional processor (CPU) 182, as described above. However, in addition the scheduler computing device 704 may also include other types or architectures of processing circuits. In the illustrated embodiment, the scheduler computing device 704 may include a graphical processing unit (GPU) 782 and/or a re-configurable circuit (e.g., a field programmable gate array (FPGA), application-specific integrated circuit (ASIC), etc.) 783. It is understood that the above are merely a few illustrative examples to which the disclosed subject matter is not limited.

In the illustrated embodiment, the system 700 may include the plurality of data nodes 708. In such an embodiment, the plurality of data nodes 708 may include a heterogeneous mix of data nodes 706 having various different respective hardware, firmware, and/or software configurations. In such an embodiment, the scheduler computing device 704 may be configured to consider these differing capabilities when assigning a task 172 to a particular data node 706.

For example, in one embodiment, the data node 706 may include a central processor 112, a memory 114, and an intelligent storage medium (ISM) 116, as described above in reference to FIG. 1. However, in addition the data node 706 may include a central GPU 712. For example, in one embodiment, the data node 706 may include a system-on-a-chip (SoC) or other integrated circuit that includes a plurality of processing elements or processors (e.g., CPU 112 and GPU 712).

In such an embodiment, the scheduler 704 may be configured to assign the task 172 not just to the central or host portion of the data node 706 but to the GPU 712 or the CPU 112. In some embodiments, the task 172 may be one that would benefit from the single-instruction-multiple-thread (SIMT) processing capabilities found in most GPUs. In such an embodiment, the scheduler 704 may assign the task 172 to the most capable processor, the central GPU 712.

As a first example, in the illustrated embodiment, the scheduler 704 may assign a computing task 172 not just to data node 706, but also to the central GPU 712. In such an embodiment, the movement of the data 782i may occur similarly to the traditional case. Specifically, data 782i may be stored permanently or semi-permanently in the memory 143 of the intelligent storage medium 116. When the computing task 172 is to be executed, this data 782i may be copied from the ISM 116 to the memory 114. The central GPU 712 may then access the data 782i from the memory 114. The results of the computing task 172 or the output data 782o may be stored within the memory 114. Eventually (e.g., at the end of the computing task, etc.), the output data 782o may be permanently or semi-permanently stored within the ISM 116.

In another embodiment, the data node 706b may include the CPU 112 and memory 114 described in FIG. 1. But, the data node 706b may also include an ISM 716b that includes additional processing elements or capabilities. Specifically, in one embodiment, the ISM 716b may include a controller processor 142, a controller GPU 742, and a memory 143. Again, in various embodiments, the controller processors 142 and 742 may both be included on a SoC 743 or other pre-packaged module. It is understood that the above are merely a few illustrative examples to which the disclosed subject matter is not limited.

In the illustrated embodiment, the scheduler 704 may be aware that the data node 706b includes an ISM device 716b with the controller GPU 742 (which the data node 706 does not). Therefore, if the task 172 is one that may benefit from the SIMT or similar processing paradigm of the controller GPU 742, and the more rapid data transfers that happen within ISM 716 (compared to from ISM 116 to Memory 114 and GPU 712), the scheduler 704 may assign the task 172 to the data node 706b instead of the data node 706.

In the illustrated embodiment, the scheduler 704 may assign a computing task 172 not just to data node 706b, but also to the ISM controller GPU 742. In such an embodiment, the movement of the data 784i may occur similarly to the ISM case described in FIG. 1. Specifically, data 784i may be stored permanently or semi-permanently in the memory 143 of the intelligent storage medium 116. When the computing task 172 is to be executed, this data 784i may remain in the memory 143. The controller GPU 742 may then access the data 784i from the memory 143. The results of the computing task 172 or the output data 784o may be stored within the memory 143.

Data node 706c is another embodiment of a multi-processor equipped ISM 716c. In the illustrated embodiment, the data node 706c may include the CPU 112 and memory 114 described in FIG. 1. But, the data node 706c may also include an ISM 716c that includes additional processing elements or capabilities. Specifically, in one embodiment, the ISM 716b may include a controller processor 142, a controller FPGA 744, and a memory 143. Again, in various embodiments, the controller processors 142 and 744 may both be included on separate pre-packaged modules or chips. It is understood that the above are merely a few illustrative examples to which the disclosed subject matter is not limited.

In the illustrated embodiment, the scheduler 704 may assign the task 172 to the controller FPGA 744 much the way the task 172 was assigned to the controller GPU 742 of data node 706b, in the previous example. The input data 786i may remain within the memory 143. The output data 786o may ultimately be stored in the ISM 761c. In various embodiments, the scheduler 704 may dynamically program the FPGA 744 with new capabilities or the ability to perform new operations. For example, in one embodiment, the FPGA 744 may include a look-up table (LUT) that may be dynamically re-programmed based upon a desired function. Furthermore, the scheduler 704 may preferentially send tasks 172 to Data Node 706c, and thence to ISM 716c, that may benefit from ISM 716c's FPGA performing such specially programmed operations. It is understood that the above is merely one illustrative example to which the disclosed subject matter is not limited.

In the illustrated embodiment, the data node 706d illustrates that the data nodes of 708 may include any permutation of these multiple processor circuits and ISMs with various on-board capabilities. For example, the data node 706d itself may include a central CPU 112, a central GPU 712, a central FPGA 713, and the central or system memory 114. Likewise, the ISM 716d may include the controller processor 142, the controller GPU 742, the controller FPGA 744, and the memory 143. It is understood that the above are merely a few illustrative examples to which the disclosed subject matter is not limited.

In various embodiments, the scheduler 704 may base task scheduling, at least in part, upon the capabilities of each data node's processors. For example, a task 172 may be capable of being performed by a data node 706 with or without GPU 712 or 742. However, if there is a time constraint for the task's execution, or (for example) if the nature of the task benefits from SIMT processing, the scheduler 704 may prefer a GPU 712 or 742 over general purpose processor 112 or 142. In some embodiments, a certain task 172 may prefer or require a certain number of processor cores for best execution (e.g., 4, 9, 16, etc.) and the number of cores in a CPU 112 or 142 may be considered.

In various embodiments, the capabilities of the various data nodes 708 may not be limited to the hardware capabilities described above. In various embodiments, the data nodes 708 may be configured to execute different firmware or software. For example, the controller processor 142 of ISM 716b may execute a slightly different version of the microcode or firmware than the controller processor 142 of ISM 716c. This may allow the scheduler 704 the ability to execute a task 172 more efficiently on either data node 706b or 706c, and assign tasks 172 accordingly. In another embodiment, the controller processor 142 of one of the data nodes 708 may not be able to execute the task 172. In such an embodiment, the boundaries of the instruction groups (shown in FIG. 3) may vary based upon the firmware or software versions or types executed by the data nodes 708.

In various embodiments, the decision by the scheduler 104 as to where or to which data node 708 to assign the task 172 may be based upon factors in addition to the capabilities of the processing elements (e.g., CPU 112, GPU 742, etc.) or the location of the desired data. In some embodiments, the desired data may be stored in multiple locations (e.g., for purposes of redundancy, etc.). In such an embodiment or others, the other factors associated with the respective data nodes 708 may be considered by the scheduler 704.

In one such embodiment, the system 700 dynamics may influence the overall throughput of system 700. Therefore, the scheduler 704 might make a bad scheduling decision if it were to schedule a task 172 based solely on the amount IO traffic. In one embodiment, if a data node 706 has a high central CPU 112 utilization, the scheduler 704 may schedule a 172 task to the ISM 116. Conversely, if a data node 706 experiences high IO traffic, it might be better to schedule a task 172 to the central CPU 112, as each incremental change to the data may be experienced by the memory 114 and not the memory 143 (which is flooded with other IO requests). It is understood that the above are merely a few illustrative examples to which the disclosed subject matter is not limited.

In such an embodiment, the scheduler 704 or system 700 may perform load balancing. In various embodiments, the scheduler 704 may, when performing task scheduling, consider system dynamics, such as, for example, IO performance, CPU utilization, SSD computing throughput, SSD IO throughput, incoming task rates, throughput, power, response time, system behavioral properties (e.g., execution time jitter, failure rate, etc.). It is understood that the above are merely a few illustrative examples to which the disclosed subject matter is not limited.

In some embodiments, the scheduler 704 may consider a number of factors when determining how and where to schedule a task. As described above, the scheduler 704 may consider the amount of data transferred to complete a task. In such an embodiment, this may be the scheduler 704's primary influencing factor. However, sometimes the advantage of selecting on processor over the other (according to the primary influencing factor) may be relatively small. In such an embodiment, secondary or tertiary factors may be considered. In some embodiments, the prioritization of assignment factors may be based upon a set policy. In such an embodiment, the amount of data transferred may not always be the primary selection factor. It is understood that the above are merely a few illustrative examples to which the disclosed subject matter is not limited.

In various embodiments, the scheduler 704 may be configured to consider the requirements or preferred factors for a given task 172. For example, a task 172 may be sensitive to (or require a certain level of) memory capacity, a completion time, etc. It is understood that the above are merely a few illustrative examples to which the disclosed subject matter is not limited.

FIG. 8 is a block diagram of an example embodiment of a system 800 in accordance with the disclosed subject matter. In various embodiments, the system 800 shows a data node 806 that includes a CPU or central processor 112, a central GPU 712, a central FPGA (or re-programmable processor) 713, a memory 114, and an intelligent storage medium (ISM) 816. The ISM 816 may include a controller processor 142, a controller GPU 742, a controller FPGA 774, and a memory 143, as described above.

In the illustrated embodiment, the general categories described above are maintained regardless of which of the various processors within the host or ISM 816 perform the task. In various embodiments, the types of processing tasks may be sub-divided in other ways than host/ISM, such as for example, as main CPU versus GPU, or generalized (e.g., CPU and GPU) versus specialized (e.g., FPGA). It is understood that the above are merely a few illustrative examples to which the disclosed subject matter is not limited.

In the illustrated embodiment, the off-loaded operations 802 may involve one of the ISM 816's processors. In such an embodiment, regardless of which processor 142, 742, or 744 executes the task, the input data 882$i$ and the output data 882$o$ may be stored in the memory 143, similarly to that shown in FIG. 2 above.

In the illustrated embodiment, the host computed operations 804 may involve one of the data node 806's main or central processors. In such an embodiment, regardless of which processor 112, 712, or 713 executes the task, the input data 884$i$ and the output data 884$o$ may be stored in the memory 114, similarly to that shown in FIG. 2 above.

In the illustrated embodiment, after the host computed operations 804 have completed, the data 884$o$ may be stored back in the ISM 816's memory 143. It is understood that the above is merely one illustrative example to which the disclosed subject matter is not limited.

FIG. 9 is a table of an example embodiment of a classification system 900 in accordance with the disclosed subject matter. In the illustrated embodiment, the table 900 shows a number of example operations, subroutines, or functions. The table 900 then shows three example classification or categorization schemes that may be employed with the disclosed subject matter. It is understood that the above are merely a few illustrative examples to which the disclosed subject matter is not limited.

As described above, the instructions or tasks may be categorized into different groups. Based upon which group or category each task or instruction falls into or is associated with, the scheduler may decide which processor (host or ISM, CPU or GPU, etc.) will be assigned that task. As described above, the tasks or instructions may be grouped into an off-loadable classification 332, a host-computable classification 336, and a equivocal classification 334.

In the illustrated embodiment, the classifications may become even more granular and may include even more information. The scheduler may be configured to make use of this extra information when deciding where to assign the task.

In one embodiment, the off-loadable classification 332 may be sub-divided into additional categories. In the illustrated embodiment, three sub-classifications 941, 942, and 943 are shown, but the disclosed subject matter is not so limited. In such an embodiment, classification 941 may include tasks that can be executed by a first type of processor (e.g., a general purpose processor or controller processor). Classification 942 may include tasks that can be executed by a second type of processor (e.g., a graphics processor). Classification 943 may include tasks that can also be executed by the second type of processor (e.g., a graphics processor), but only by particular version of that processor (e.g., those with a certain firmware, a shader unit, a type of codec or compression scheme processor, etc.). It is understood that the above are merely a few illustrative examples to which the disclosed subject matter is not limited.

In one embodiment, the host-computable classification 336 may be sub-divided into additional categories. In the illustrated embodiment, two sub-classifications 945 and 946 are shown but the disclosed subject matter is not so limited. In such an embodiment, classification 945 may include tasks that can be executed by a first type of processor (e.g., a general purpose processor or controller processor). Classification 946 may include tasks that can be executed by a second type of processor (e.g., a graphics processor). It is understood that the above are merely a few illustrative examples to which the disclosed subject matter is not limited.

In various embodiments, other forms of sub-classification may occur. For example, sub-classifications may exist based upon the number of cores a task requires or desires, the limiting or controlling nature of the task (e.g., IO driven, SIMT, computational versus load/stores, etc.), a level of required security, the amount of power required to complete the task, etc. It is understood that the above are merely a few illustrative examples to which the disclosed subject matter is not limited.

Further, in various embodiments, the sub-classifications may overlap. In such an embodiment, a sub-classification may be performed by a number of processors (or whatever classification metric is employed). For example, some operations may be more efficiently performed by a general-purpose processor, but may be performed (although less efficiently) by a graphical processor (or vice versa). In another embodiment, an operation may be performed in one instruction by a first type of processor, but may be capable of being performed by a second type of processor if the operation is broken down into smaller steps. In such an embodiment, this may be done by the second processor's firmware. In such embodiments, if a sub-classification includes overlaps a preference scheme may be employed to indicate what type of processors is preferred to perform tasks that fall into the overlapping sub-classifications.

Figure 10:
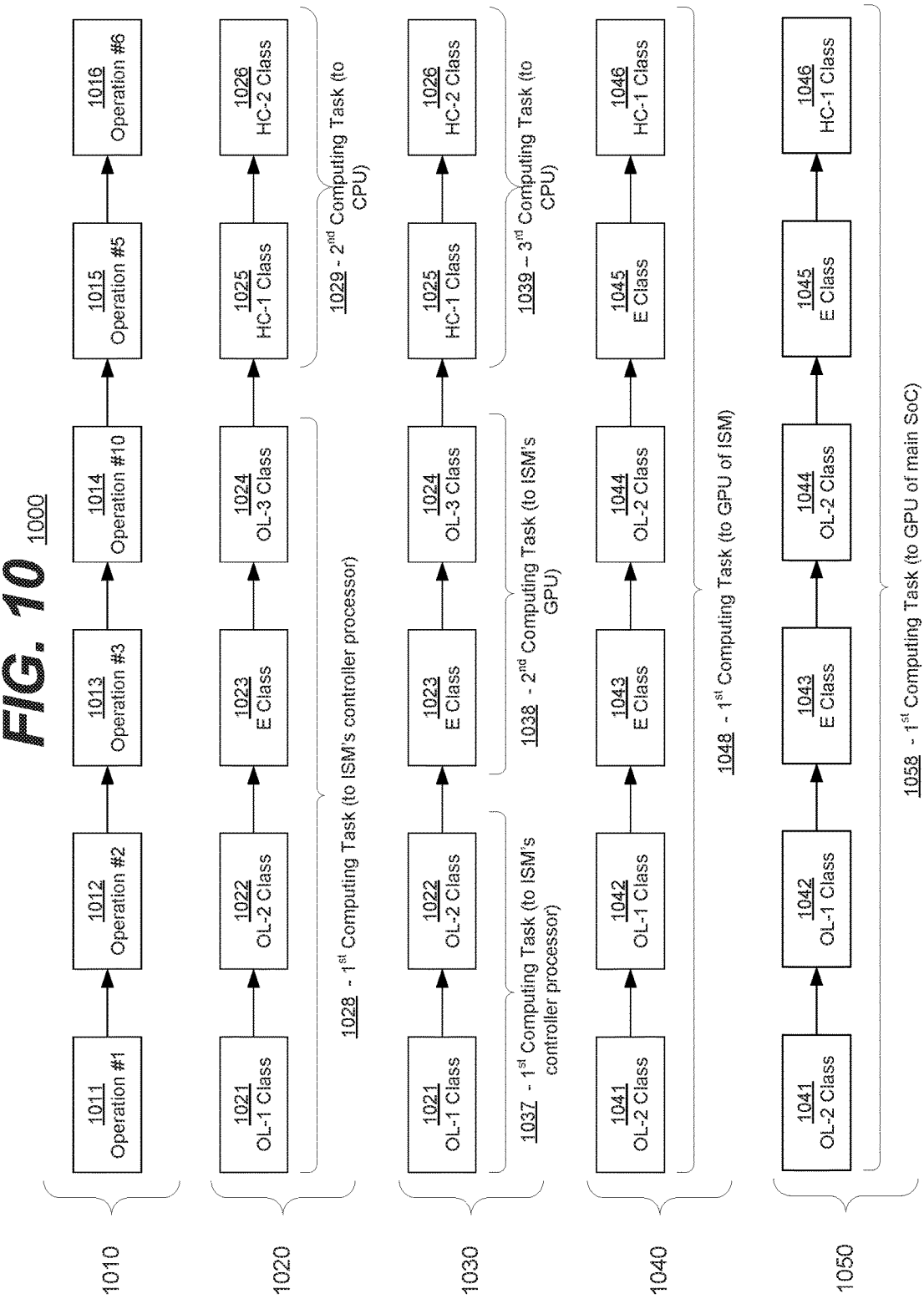
FIG. 10 is a block diagram of an example embodiment of a chain of operations in accordance with the disclosed subject matter.

FIG. 10 is a block diagram of an example embodiment of a chain of operations 1000 in accordance with the disclosed subject matter. FIG. 10 illustrates how a scheduler may take a larger computing task, classify each of the operations that comprise the larger computing task, divide the larger computing task into two or more smaller computing tasks or chains of operations, and then assign each of those smaller computing tasks or chains of operations to either the processor(s) of the host or the processor(s) of the ISM for execution.

In the illustrated embodiment, portion 1010 shows how a larger computing task may include a series or chain of operations that execute one after the other. In the illustrated embodiment, this larger computing task includes, in order, operation #1 1011, operation #2 1012, operation #3 1013, operation #4 1014, operation #5 1015, and operation #6 1016. In various embodiments, these operations may be tagged or marked as favoring assignment to a particular processor (e.g., the data node's central processor, the ISM's controller processor, etc.). It is understood that the above are merely a few illustrative examples to which the disclosed subject matter is not limited.

Portion 1020 illustrates that, despite being from four different classes, the operations 1021 (off-loadable sub-class #1), 1022 (off-loadable sub-class #2), 1023 (equivocal class), and 1024 (off-loadable sub-class #3), a scheduler might assign them all to a single processor, for example the ISM's controller processor. These operations are designated group 1028. In such an embodiment, all of the operations may be capable of being performed by the controller processor even if one or more of them might be more efficiently performed by another processor (e.g., the ISM's GPU). In such an embodiment, the scheduler may determine that continuity of operation, data transfer rates, or load balancing, or some other factor allows the operations of group 1028 to be performed by a selected single processor. Likewise, group 1029 includes the operations 1025 (host computable sub-class #1) and 1026 (host computable sub-class #2) that may be performed by the host CPU, despite being from two separate sub-classes.

Portion 1030 illustrates that the same operations may be assigned to multiple processors within the same ISM (or same host system, in some embodiments). In the illustrated embodiment, the operations 1021 (off-loadable sub-class #1), and 1022 (off-loadable sub-class #2) may be assigned to the ISM's controller processor (group 1037). However, in this embodiment, the operations 1023 (equivocal class) and 1024 (off-loadable sub-class #3) may be assigned to the ISM's GPU (group 1038). In such an embodiment, maybe the controller processor is not capable of handling operations from the off-loadable sub-class #3, or maybe the ISM GPU is more efficient or quicker in completing the task, or maybe another operation (not shown) will need to use the controller processor when operation 1023 would be executing. It is understood that the above are merely a few illustrative examples of scheduling considerations, to which the disclosed subject matter is not limited. As described above. The operations 1025 and 1026 (of group 1039) may be assigned to the host's CPU.

In various embodiments, the scheduler may switch back and forth between processors as desired. In the case of groups 1037 and 1038, since the two processors are part of the same device or memory system (e.g., the ISM, and ISM's memory) the difference in data transfer latencies between the two processors may not exist or may be minimal. It is understood that the above are merely a few illustrative examples to which the disclosed subject matter is not limited.

Portion 1040 illustrates that a processor may be able to complete tasks that are normally thought of as the domain of another type of processor. For example, the host-computable sub-class #1 may be a class of operations in which the size of the output data is expected to be greater than to the input data, as described above. But one of the ISM processors may be capable of performing that task. The IO requirements may not be as ideally suited to the ISM as to the host's processors, but the ISM processor may be capable of doing the task. Portion 1040 illustrates an example of that using group 1048. In the illustrated embodiment, all the operations 1041 (off-loadable sub-class #2), 1042 (off-loadable sub-class #1), 1043 (equivocal class), 1044 (off-loadable sub-class #2), 1045 (equivocal class), and 1046 (host-computable sub-class #1) may be assigned to the ISM's GPU for processing.

Likewise, portion 1050 illustrates, using group 1058, that all the operations 1041 (off-loadable sub-class #2), 1042 (off-loadable sub-class #1), 1043 (equivocal class), 1044 (off-loadable sub-class #2), 1045 (equivocal class), and 1046 (host-computable sub-class #1) may be assigned to the host or SoC's GPU for processing. It is understood that the above are merely a few illustrative examples to which the disclosed subject matter is not limited.

The assignments illustrated in 1040 and 1050 may occur because the otherwise "optimal" processing agent has become sub-optimal due to system level constraints, such as current bandwidth/throughput loads, alternate tasks of higher priority already being scheduled for "optimal" processors, the requirement to move large amounts of data, or the like.

In various embodiments, the scheduler may be configured to control the workflow of the intermediate or completed tasks for the optimization of the entire chain of tasks and not just the atomized sub-chains. In such an embodiment, the scheduler may be configured to determine the workflow of tasks considering the entire workflow based, at least in part, on a policy that defines an objective goal or optimization plan. For example, instead of moving data back and forth to improve the IO efficiency of single chain (e.g., group 1028), the scheduler may want to minimize the power consumption (or some other metric) of operation. In such an embodiment, the scheduler may keep the entire or a majority of the chain within the ISM (e.g., portion 1040). In another embodiment, if the tasks do not require persistency, or if the system has persistency mechanism like NVDIMM-P, the scheduler may wish to place the final output in DRAM or host memory instead of the ISM's memory. It is understood that the above are merely a few illustrative examples to which the disclosed subject matter is not limited.

Figure 11:
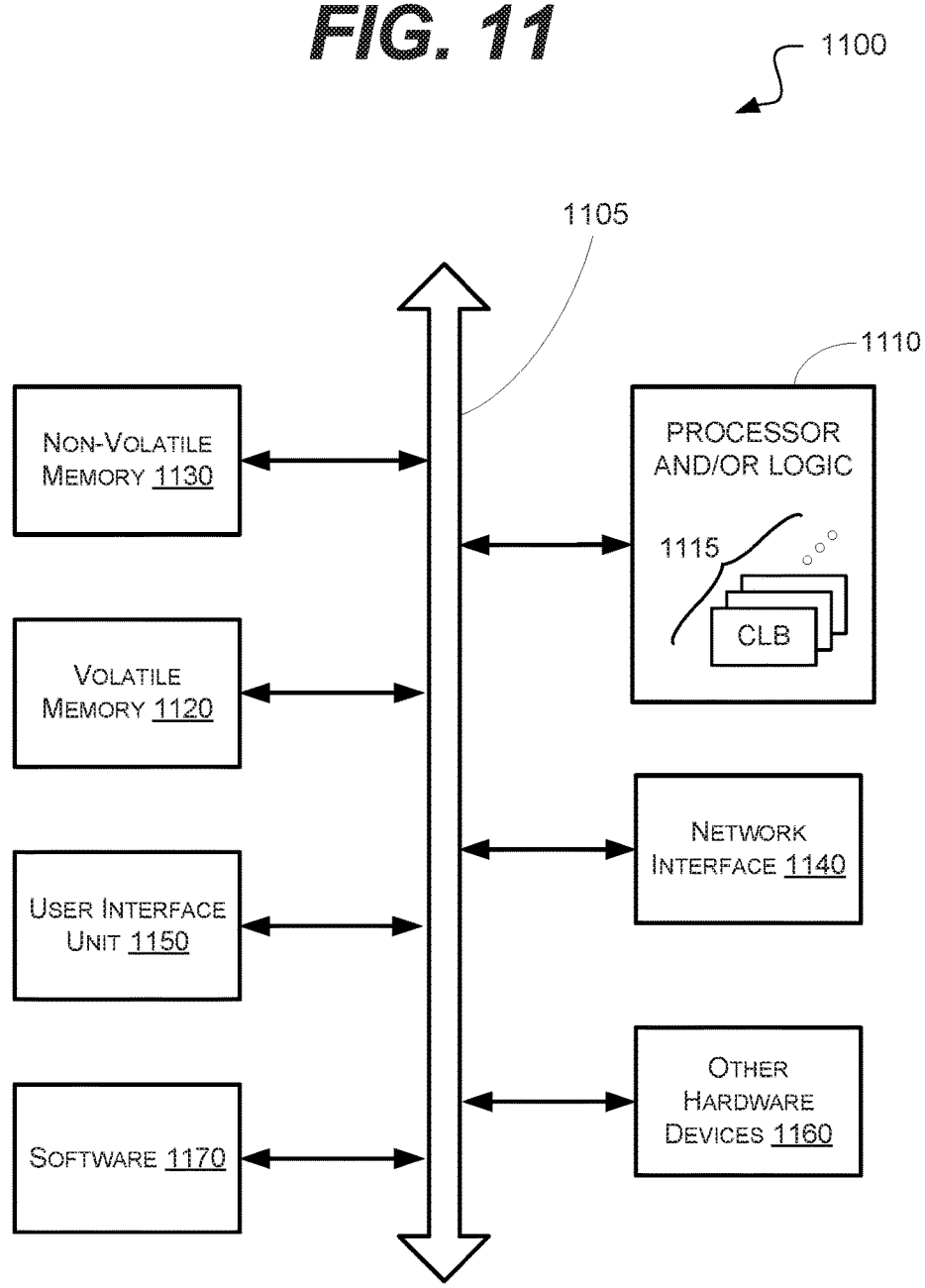
FIG. 11 is a schematic block diagram of an information processing system that may include devices formed according to principles of the disclosed subject matter.

FIG. 11 is a schematic block diagram of an information processing system 1100, which may include semiconductor devices formed according to principles of the disclosed subject matter.

Referring to FIG. 11, an information processing system 1100 may include one or more of devices constructed according to the principles of the disclosed subject matter. In another embodiment, the information processing system 1100 may employ or execute one or more techniques according to the principles of the disclosed subject matter.

In various embodiments, the information processing system 1100 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 1100 may be used by a user (not shown).

The information processing system 1100 according to the disclosed subject matter may further include a central processing unit (CPU), logic, or processor 1110. In some embodiments, the processor 1110 may include one or more functional unit blocks (FUBs) or combinational logic blocks (CLBs) 1115. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 1100 according to the disclosed subject matter may further include a volatile memory 1120 (e.g., a Random Access Memory (RAM), etc.). The information processing system 1100 according to the disclosed subject matter may further include a non-volatile memory 1130 (e.g., a hard drive, an optical memory, a NAND or Flash memory, etc.). In some embodiments, either the volatile memory 1120, the non-volatile memory 1130, or a combination or portions thereof may be referred to as a "storage medium". In various embodiments, the volatile memory 1120 and/or the non-volatile memory 1130 may be configured to store data in a semi-permanent or substantially permanent form.

In various embodiments, the information processing system 1100 may include one or more network interfaces 1140 configured to allow the information processing system 1100 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 1100 according to the disclosed subject matter may further include a user interface unit 1150 (e.g., a display adapter, a haptic interface, a human interface device, etc.). In various embodiments, this user interface unit 1150 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 1100 may include one or more other devices or hardware components 1160 (e.g., a display or monitor, a keyboard, a mouse, a camera, a fingerprint reader, a video processor, etc.). It is understood that the above are merely a few illustrative examples to which the disclosed subject matter is not limited.

The information processing system 1100 according to the disclosed subject matter may further include one or more system buses 1105. In such an embodiment, the system bus 1105 may be configured to communicatively couple the processor 1110, the volatile memory 1120, the non-volatile memory 1130, the network interface 1140, the user interface unit 1150, and one or more hardware components 1160. Data processed by the processor 1110 or data inputted from outside of the non-volatile memory 1130 may be stored in either the non-volatile memory 1130 or the volatile memory 1120.

In various embodiments, the information processing system 1100 may include or execute one or more software components 1170. In some embodiments, the software components 1170 may include an operating system (OS) and/or an application. In some embodiments, the OS may be configured to provide one or more services to an application and manage or act as an intermediary between the application and the various hardware components (e.g., the processor 1110, a network interface 1140, etc.) of the information processing system 1100. In such an embodiment, the information processing system 1100 may include one or more native applications, which may be installed locally (e.g., within the non-volatile memory 1130, etc.) and configured to be executed directly by the processor 1110 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 1110.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A scheduler computing device comprising:
a computing task memory configured to store at least one computing task,
wherein the computing task is to be executed by a data node of a distributed computing system, wherein the distributed computing system comprises at least one data node, wherein each data node includes at least one host processor and an intelligent storage medium, wherein the intelligent storage medium comprises a form of storage medium that includes at least one controller processor and a non-volatile memory;
wherein each data node includes at least three processors, wherein the at least three processors includes the at least one host processor and the at least one controller processor; and
a scheduler processor configured to:
decide whether to assign the computing task to be executed by either one of the host processors of the data node or one of the controller processors of the intelligent storage medium based, at least in part, upon an amount of output data associated with the computing task compared to an amount of input data associated with the computing task, wherein if the amount of input data is larger than the amount of output data, deciding to assign the computing task to the one of the controller processors of the intelligent storage medium, and
assign, according to the decision, the computing task to be executed by either one of the host processors of the data node or one of the controller processors of the intelligent storage medium.

2. The scheduler computing device of claim 1, wherein the distributed computing system comprises a heterogeneous plurality of data nodes, wherein the plurality of data nodes includes data nodes having respective controller processors with differing capabilities.

3. The scheduler computing device of claim 2, wherein the plurality of data nodes includes:
a data node that comprises an intelligent storage medium having a graphical processor.

4. The scheduler computing device of claim 1, wherein the scheduler processor is configured to:
divide a larger computing task into one or more smaller computing tasks, wherein each of the computing tasks includes a chain of one or more operations, and wherein each smaller computing task is performed by either one of the host processors of the data node or the intelligent storage medium of the data node;
classify each smaller computing task into one of at least two categories, wherein each category is capable of being performed by at least one processor; and
based upon the category associated with a smaller computing task, assign each respective smaller computing task to either a host processor of the data node or a processor of the intelligent storage medium of the data node.

5. The scheduler computing device of claim 4, wherein the scheduler processor is configured to:
assign one of the smaller computing tasks to be executed by one of the processors of the intelligent storage medium even if the smaller computing task would be more efficiently executed by one of the host processors, if the larger computing task is made more efficient.

6. The scheduler computing device of claim 1, wherein the scheduler processor is configured to:
assign the computing task to be executed by either one of the host processors of the data node or one of the processors of the intelligent storage medium, based, at least in part, upon load balancing of computing tasks across a plurality of data nodes.

7. The scheduler computing device of claim 1, wherein the scheduler processor is configured to:
assign the computing task to be executed by either one of the host processors of the data node or one of the processors of the intelligent storage medium, based, primarily upon an amount of input data compared to an amount of output data, and secondarily upon a characteristic associated with at least one data node.

8. The scheduler computing device of claim 7, wherein a characteristic associated with the at least one data node is determined by a preconfigured policy setting.

9. A method comprising:
receiving a computing task, wherein the computing task includes a plurality of operations;
allocating the computing task to a data node, wherein the data node includes at least one host processor and an intelligent storage medium, wherein the intelligent storage medium comprises a form of storage medium that includes at least one controller processor and a non-volatile memory, wherein each data node includes at least three processors, wherein the at least three processors includes the at least one host processor and the at least one controller processor;

dividing the computing task into at least a first chain of operations and a second chain of operations, wherein dividing the computing task includes determining for each chain of operations an amount of output data associated with a respective chain of operations and an amount of input data associated with the respective chain of operations, and wherein if the amount of input data is larger than the amount of output data, deciding to assign the computing task to the one of the controller processors of the intelligent storage medium;

assigning the first chain of operations to the intelligent storage medium of the data node; and assigning the second chain of operations to a central processor of the data node.

10. The method of claim 9, wherein the distributed computing system comprises a heterogeneous plurality of data nodes, wherein the plurality of data nodes includes data nodes having respective controller processors with differing capabilities.

11. The method of claim 9, wherein dividing includes:
further dividing each chain of operations into a plurality of sub-chains; and
assigning each sub-chain to a different processor.

12. The method of claim 9, wherein dividing includes:
dividing based, at least in part, upon load balancing of computing tasks across the plurality of data nodes.

13. The method of claim 9, wherein dividing includes:
dividing the computing task based, primarily upon an amount of input data compared to an amount of output data, and secondarily upon a characteristic associated with the plurality of data nodes.

14. The method of claim 13, wherein a characteristic associated with the plurality of data nodes is determined by a preconfigured policy setting.

15. A data node comprising:
a central processor configured to execute at least one of a first set of operations upon data stored by an intelligent storage medium;
the intelligent storage medium comprising:
a memory configured to store data,
a first controller processor configured to execute at least one of a second set of operations upon data stored by the intelligent storage medium, and
a second controller processor configured to execute at least one of a third set of operations upon data stored by the intelligent storage medium; and
a network interface configured to receive a plurality of operations from a scheduling computing device; and
wherein the data node is configured to:
divide the computing task into at least the first set of operations and a second set of operations, wherein dividing the computing task includes determining for each chain of operations an amount of output data associated with a respective chain of operations and an amount of input data associated with the respective chain of operations, and wherein if the amount of input data is larger than the amount of output data, deciding to assign the computing task to the one of the controller processors of the intelligent storage medium,
assign the first set of operations to the central processor for execution, and
assign the second set of operations to the intelligent storage medium for execution.

16. The data node of claim 15, wherein the first controller processor includes a general purpose processor, and
wherein the second controller processor includes a graphical processor.

17. The data node of claim 15, wherein the first controller processor includes a general purpose processor, and
wherein the second controller processor includes a re-programmable processor.

18. The data node of claim 15, wherein that data node is configured to:
assign the computing task to be executed by either one of the processors of the data node or one of the processors of the intelligent storage medium, based, at least in part, upon load balancing of computing tasks across a plurality of data nodes.

19. The data node of claim 15, wherein that data node is configured to:
assign the computing task to be executed by either one of the processors of the data node or one of the processors of the intelligent storage medium, based, primarily upon an amount of input data compared to an amount of output data, and secondarily upon a characteristic associated with at least one data node.

20. The data node of claim 19, wherein a characteristic associated with the at least one data node is determined by a preconfigured policy setting.

* * * * *